United States Patent
Ishida

(10) Patent No.: US 11,802,216 B2
(45) Date of Patent: Oct. 31, 2023

(54) WHITE INK COMPOSITION AND INK JET RECORDING METHOD

(71) Applicant: Seiko Epson Corporation, Tokyo (JP)

(72) Inventor: Kohei Ishida, Matsumoto (JP)

(73) Assignee: SEIKO EPSON CORPORATION

( * ) Notice: Subject to any disclaimer, the term of this patent is extended or adjusted under 35 U.S.C. 154(b) by 271 days.

(21) Appl. No.: 17/386,868

(22) Filed: Jul. 28, 2021

(65) Prior Publication Data
US 2022/0033672 A1  Feb. 3, 2022

(30) Foreign Application Priority Data
Jul. 29, 2020  (JP) .................. 2020-127930

(51) Int. Cl.
C09D 11/54  (2014.01)
C09D 11/36  (2014.01)
C09D 11/322  (2014.01)

(52) U.S. Cl.
CPC ............ C09D 11/54 (2013.01); C09D 11/322 (2013.01); C09D 11/36 (2013.01)

(58) Field of Classification Search
CPC .............. B41M 5/0023; B41M 5/0047; B41M 5/0064; C09D 11/322; C09D 11/037; C09D 11/033; B41J 2/2107
See application file for complete search history.

(56) References Cited

U.S. PATENT DOCUMENTS

| 2014/0132684 A1 | 5/2014 | Ohta | |
| 2015/0197654 A1 | 7/2015 | Okuda et al. | |
| 2015/0375528 A1* | 12/2015 | Kitagawa | D06P 1/44 428/196 |
| 2017/0165979 A1* | 6/2017 | Ohta | B41M 7/009 |
| 2018/0258298 A1* | 9/2018 | Shiiba | C08G 18/7671 |
| 2018/0282567 A1* | 10/2018 | Ishida | D06P 1/54 |
| 2019/0284411 A1* | 9/2019 | Okuda | C09D 11/324 |
| 2021/0024767 A1* | 1/2021 | Asakawa | B41J 11/0015 |
| 2021/0129569 A1* | 5/2021 | Fujita | C09D 11/106 |
| 2021/0198503 A1* | 7/2021 | Yatake | C08G 18/222 |

FOREIGN PATENT DOCUMENTS

| CN | 103802518 A | 5/2014 |
| JP | 2015-147405 A | 8/2015 |
| JP | 2018-104561 A | 7/2018 |

* cited by examiner

*Primary Examiner* — John Zimmermann
(74) *Attorney, Agent, or Firm* — Harness, Dickey & Pierce, P.L.C.

(57) ABSTRACT

A white ink composition is an aqueous ink jet ink and is used for recording on a low-absorbing recording medium or a non-absorbing recording medium, the white ink composition includes a white pigment; and a fixing resin, and the fixing resin contains a urethane resin having a THF soluble component in a two-hour dissolution time of 90 percent by mass or more and a glass transition temperature of 20° C. to 50° C.

14 Claims, 1 Drawing Sheet

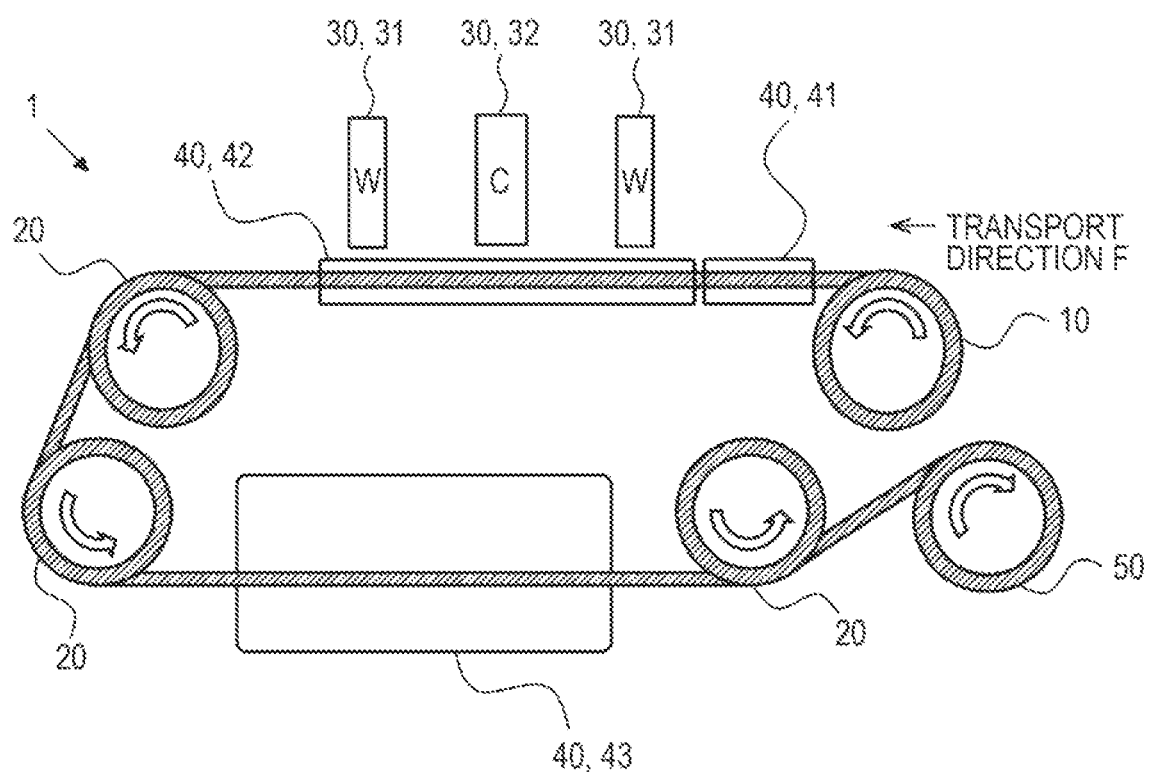

WHITE INK COMPOSITION AND INK JET RECORDING METHOD

The present application is based on, and claims priority from JP Application Serial Number 2020-127930, filed Jul. 29, 2020, the disclosure of which is hereby incorporated by reference herein in its entirety.

BACKGROUND

1. Technical Field

The present disclosure relates to a white ink composition and an ink jet recording method.

2. Related Art

An ink jet recording method is able to record a highly fine image by a relatively simple apparatus and has been rapidly developed in various fields. In particular, various investigations have been carried out, for example, to obtain a recorded matter having a higher quality. For example, when inks are overlapped and recorded on a non-absorbing recording medium or the like, in order to provide a recording method which can prevent bleeding between the inks, suppress aggregation irregularity of the inks, and enable an ink jet nozzle not to easily cause clogging, JP-A-2015-147405 has disclosed a recording method in which a first reaction liquid containing a predetermined aggregating agent, a first ink containing a colorant, a second reaction liquid containing a predetermined aggregating agent, and a second ink containing a colorant are overlapped and adhered in this order on a recording medium.

Incidentally, in the case in which recording is performed on a transparent recording medium, a white ink is recorded as a background image for at least one color ink so as to improve the visibility thereof. For example, after a color ink and a white ink which forms a background image are overlapped and adhered to a recording medium, a laminate film is further stuck thereto in some cases. However, when the white ink is used, problems in that, for example, the laminate film is liable to be peeled away due to a decrease in laminate strength and/or blocking is liable to occur may arise in some cases.

SUMMARY

According to an aspect of the present disclosure, there is provided a white ink composition which is an aqueous ink jet ink and which is used for recording on a low-absorbing recording medium or a non-absorbing recording medium, the white ink composition comprising: a white pigment; and a fixing resin. In the white ink composition described above, the fixing resin contains a urethane resin having a THF (tetrahydrofuran) soluble component in a two-hour dissolution time of 90 percent by mass or more and a glass transition temperature of 20° C. to 50° C.

In addition, according to another aspect of the present disclosure, there is provided an ink jet recording method comprising a white ink adhesion step of ejecting the white ink composition described above by an ink jet method so as to be adhered to a low-absorbing recording medium or a non-absorbing recording medium.

BRIEF DESCRIPTION OF THE DRAWINGS

FIGURE is a schematic cross-sectional view showing one example a recording apparatus used in this embodiment.

DESCRIPTION OF EXEMPLARY EMBODIMENTS

Hereinafter, if needed, with reference to the drawing, although an embodiment (hereinafter, referred to as "this embodiment") of the present disclosure will be described in detail, the present disclosure is not limited thereto and may be variously changed and/or modified without departing from the scope of the present disclosure. In addition, in the drawing, the same element is designated by the same reference numeral, and duplicated description will be omitted. In addition, a positional relationship, such as up to down and left to right, is based on the positional relationship shown in the drawing unless otherwise particularly noted. Furthermore, a dimensional ratio in the drawing is not limited to the ratio shown in the drawing.

1. White Ink Composition

A white ink composition according to this embodiment is a white ink composition which is an aqueous ink jet ink and which is used for recording on a low-absorbing recording medium or a non-absorbing recording medium and includes a white pigment and a fixing resin, and the fixing resin contains a urethane resin having a THF soluble component in a two-hour dissolution time of 90 percent by mass or more and a glass transition temperature of 20° C. to 50° C. The ink jet ink is an ink to be used for recording by an ink jet method.

In recording on a low-absorbing recording medium or a non-absorbing recording medium, the white ink composition is used to form a background image or the like. In order to obtain a shielding ability of the background image, in some cases, a relatively large amount of the white ink composition may be used, or a relatively large amount of a white pigment may be contained in the ink. Accordingly, a recording surface is not likely to be made flat, and when a laminate film is stuck to the recording surface, a laminate strength thereof is decreased, and as a result, the laminate film is liable to be peeled away. In addition, for example, after printing is performed by a line printer and before the laminate film is stuck, a recorded matter may be once wound up to form a roll shape in some case, and in this case, in the roll, a recording surface of the recorded matter is brought into contact with a non-recording surface of a recording medium and may be stuck (blocking) thereto in some cases. When a blocking recording medium is peeled away, for example, an additional problem in that an ink layer is peeled away may arise in some cases. Furthermore, an abrasion resistance of the ink adhered to form an underlayer image is liable to be degraded, and when the abrasion resistance thereof is inferior, for example, rubbing may occur when the laminate film is stuck. In addition, after a non-white ink is adhered to a transparent recording medium in advance to form a non-white image, a white ink is adhered thereon to form a background image in some cases. In the case described above, a white ink layer is present at an upper side of a recording surface. In the case described above, in particular, the abrasion resistance is a serious problem.

On the other hand, in this embodiment, as the fixing resin, an urethane resin having a predetermined THF soluble component and a predetermined glass transition temperature is used. Accordingly, a recorded matter excellent in laminate strength, blocking resistance, and abrasion resistance can be obtained. Hereinafter, individual components will be described in detail.

The white ink composition of this embodiment contains a white pigment and a fixing resin and, if needed, may also contain water, a water-soluble organic solvent, a wax, a surfactant, a pH adjuster, and/or the like.

1.1. White Pigment

Although the white pigment is not particularly limited, for example, there may be mentioned C.I. Pigment White 6, 18, or 21, titanium oxide, zinc oxide, zinc sulfide, antimony oxide, zirconium oxide, white hollow resin particles, or white high molecular weight particles. The white pigments may be used alone, or at least two types thereof may be used in combination.

A content of the white pigment with respect to the total mass of the ink composition is preferably 5.0 to 20 percent by mass, more preferably 7.5 to 18 percent by mass, further preferably 10 to 17 percent by mass, and even further preferably 12 to 17 percent by mass. Since the content of the white pigment is 5.0 percent by mass or more, an adhesion amount of the white pigment to a recording medium is increased, and hence, the present disclosure is particularly preferable. In addition, since the content of the white pigment is 20 percent by mass or less, an ejection stability tends to be improved. Since having a relatively large average particle diameter, although the white pigment is preferable in terms of an increase in image shielding ability, in particular, smoothness of a surface of the image tends to be degraded. However, since the content of the white pigment is set to 20 percent by mass or less, the present disclosure is particularly effective. A volume average particle diameter of the white pigment is preferably, for example, 100 to 400 nm. The volume average particle diameter is a D50 value obtained by a dynamic scattering method.

1.2. Fixing Resin

The fixing resin contains a predetermined urethane resin and, if needed, may also contain at least one another resin, such as an acrylic resin, a fluorene resin, a polyolefin resin, a rosin modified resin, a terpene resin, a polyester resin, a polyamide resin, an epoxy resin, a vinyl chloride resin, or an ethylene-vinyl acetate resin. The fixing resins may be used alone, or at least two types thereof may be used in combination.

Since the fixing resin is included, an adhesive property to a recording medium and an abrasion resistance of the ink composition are further improved. In particular, in this embodiment, since the predetermined urethane resin is contained, the laminate strength is further improved, and the blocking resistance is also further improved.

The fixing resin, such as an urethane resin, is preferably in the form of resin particles. Since the fixing resin is in the form of resin particles, a dispersion stability tends to be further improved. In addition, the resin particles of the fixing resin are preferably contained in the ink as particles other than the pigment particles.

A content of the fixing resin with respect to the total mass of the ink composition is preferably 1.0 to 15 percent by mass, more preferably 3.0 to 12 percent by mass, and further preferably 5.0 to 10 percent by mass. Since the content of the fixing resin is 1.0 percent by mass or more, the laminate strength and the abrasion resistance tend to be further improved. In addition, since the content of the fixing resin is 15 percent by mass or less, the blocking resistance tends to be further improved.

A content of the urethane resin with respect to the total mass of the ink composition is preferably 1.0 to 15 percent by mass, more preferably 3.0 to 12 percent by mass, and further preferably 5.0 to 10 percent by mass. Since the content of the urethane resin is 1.0 percent by mass or more, the laminate strength and the abrasion resistance tend to be further improved. In addition, since the content of the urethane resin is 15 percent by mass or less, the blocking resistance tends to be further improved.

1.2.1. Urethane Resin

The urethane resin is not particularly limited as long as having a THF soluble component in a two-hour dissolution time of 90 percent by mass or more and a glass transition temperature of 20° C. to 50° C. Hereinafter, the physical properties and the structure of the urethane resin will be described in detail.

1.2.1.1. THF Soluble Component

The THF soluble component in a two-hour dissolution time of the urethane resin is 90 percent by mass or more, preferably 92 to 100 percent by mass, and more preferably 94 to 99 percent by mass. Furthermore, the THF soluble component described above is preferably 95 percent by mass or more and more preferably 98 percent by mass or more. The THF soluble component in a two-hour dissolution time of 90 percent by mass or more indicates that the urethane resin contains a relatively large amount of at least one component soluble in THF within two hours. The urethane resin is estimated to be easily dissolved in THF because of the structure of the urethane resin or the like. Accordingly, it is believed that an adhesive property to a laminate film is improved, and the laminate strength is more likely to be improved. In addition, since the THF soluble component in a two-hour dissolution time is 100 percent by mass or less, the blocking resistance and the abrasion resistance tend to be further improved.

In addition, a THF soluble component in a 15-minute dissolution time of the urethane resin is preferably 40 percent by mass or more. Alternatively, the THF soluble component described above is preferably 100 percent by mass or less. Furthermore, the THF soluble component described above is preferably 50 to 100 percent by mass, more preferably 60 to 90 percent by mass, and even more preferably 65 to 80 percent by mass. Since the THF soluble component in a 15-minute dissolution time is 40 percent by mass or more, the laminate strength tends to be further improved. In addition, since the THF soluble component in a 15-minute dissolution time is 100 percent by mass or less, the blocking resistance and the abrasion resistance tend to be further improved.

For the measurement of the THF soluble component in a two-hour dissolution time and the THF soluble component in a 15-minute dissolution time, a dry mass of the urethane resin is measured, and a mixture liquid in which 100 g of tetrahydrofuran is mixed with respect to 1 g of the resin is prepared. Subsequently, the mixture liquid thus prepared is immediately centrifuged at 17,000 rpm. After a centrifugal treatment is performed for two hours or 15 minutes, a gel (solid content) remaining on a bottom of a container is separated as an insoluble component. The procedure described above is performed at 25° C. Finally, after a mixture liquid obtained after the gel is removed is dried, an urethane resin dissolved in THF is dried, and a dry mass thereof is measured. In the drying of the urethane resin and the drying of the mixture liquid obtained after the gel is removed, drying conditions may be set such that the drying is sufficiently performed so that no solvent component remains, and the THF soluble component is suitably measured. Although not particularly limited, the drying conditions may be set, for example, to 110° C. for 2 hours.

From the following equation, the THF soluble component in a two-hour dissolution time and the THF soluble component in a 15-minute dissolution time are each calculated.

THF soluble component (%)=(dry weight of urethane resin dissolved in THF)/dry weight of initial urethane resin×100

The THF soluble component in a two-hour dissolution time may be adjusted by changing the structure of the urethane resin. Although the adjustment is not particularly limited, for example, the THF soluble component can be adjusted by a cross-linked structure of the urethane resin. In particular, when the degree in cross-linked structure is decreased, the THF soluble component can be increased, and when the degree in cross-linked structure is increased, the THF soluble component can be decreased. In order to enable the urethane resin to have the cross-linked structure as described above, for example, a polyol component, a polyisocyanate component, and/or a polyamine component, each having at least three functions, may be used.

In addition, the urethane resin may be adjusted to be easily dissolved in THF, for example, such that an SP value of the urethane resin is set close to an SP value of THF.

In addition, the THF soluble component in a two-hour dissolution time and the THF soluble component in a 15-minute dissolution time each relate to a dissolution rate of the urethane resin into THF. When the dissolution rate is high, the value of the THF soluble component in a two-hour dissolution time is close to the value of the THF soluble component in a 15-minute dissolution time, and when the dissolution rate is low, the value of the THF soluble component in a two-hour dissolution time is far from the value of the THF soluble component in a 15-minute dissolution time.

Although the adjustment of the THF soluble component in a 15-minute dissolution time is not particularly limited, for example, the adjustment may be performed by changing the structure of a skeleton portion of a polyisocyanate component and/or a polyol component forming the urethane resin. For example, when the skeleton portion has an aromatic ring structure or an alicyclic structure, since the solubility is increased, and the dissolution rate is increased, the THF soluble component in a 15-minute dissolution time tends to be increased. In addition, when the skeleton portion has an aliphatic structure, since the solubility is decreased, and the dissolution rate is decreased, the THF soluble component in a 15-minute dissolution time tends to be decreased.

In addition, although not particularly limited, the THF soluble component in a two-hour dissolution time indicates a THF solubility in a saturated state in which the THF soluble component is sufficiently dissolved, and the THF soluble component in a 15-minute dissolution time indicates a THF solubility in a short time at which the THF soluble component may not be saturated and is a value to judge whether the THF soluble component is rapidly dissolved or not. For example, even if the THF soluble component in a two-hour dissolution time is 100%, when the dissolution of the THF soluble component in THF is slow, the THF soluble component in a 15-minute dissolution time may be less than 100% in some cases. When the THF soluble component in a two-hour dissolution time is adjusted low by incorporating a cross-linked structure in the urethane resin, although the blocking resistance or the like is improved by the cross-linked component, the laminate strength tends to be decreased. On the other hand, when the THF soluble component in a 15-minute dissolution time is adjusted low, the blocking resistance or the like can be preferably improved while the laminate strength is maintained.

Furthermore, among the aromatic ring structures and the alicyclic structures, for example, an urethane resin including a structure which has an alkylene group between an isocyanate group and an aromatic ring or an aliphatic ring tends to have a low solubility, and an urethane resin including a structure which has no alkylene group between an isocyanate group and an aromatic ring or an aliphatic ring tends to have a high solubility. Since the solubility is likely to be adjusted, the alkylene group has preferably 1 to 6 carbon atoms and more preferably 1 to 3 carbon atoms.

1.2.1.2. Glass Transition Temperature

The glass transition temperature is 20° C. to 50° C., preferably 23° C. to 47° C., more preferably 26° C. to 45° C., further preferably 30° C. to 45° C., and even further preferably 35° C. to 43° C. Since the glass transition temperature is 20° C. or more, the blocking resistance and the abrasion resistance are further improved. In addition, since the glass transition temperature is 50° C. or less, the laminate strength is further improved. The glass transition temperature can be adjusted by the structure of the urethane resin. In addition, the glass transition temperature can be confirmed by a known method using a differential scanning calorimetry (DSC) analysis or the like.

The glass transition temperature of the urethane resin can be adjusted by changing at least one component used for preparation of the urethane resin which will be described later. For example, by changing the number of carbon atoms and/or the structure of the skeleton portion of a polyol component and/or a polyisocyanate component, the glass transition temperature can be adjusted. In more particular, when the number of carbon atoms of the skeleton portion of the polyol component and/or the polyisocyanate component is increased, the glass transition temperature tends to be decreased.

In addition, besides the above adjustment method, when a mass ratio between the polyisocyanate component and the polyol component is changed, the glass transition temperature can also be adjusted. For example, when the polyisocyanate component has an alicyclic structure or an aromatic ring structure, the glass transition temperature tends to be increased, and when the polyol component has an alkyl structure, the glass transition temperature tends to be decreased. Hence, when an amount of the polyisocyanate component is increased, the glass transition temperature can be adjusted high, and when an amount of the polyol component is increased, the glass transition temperature can be adjusted low. In addition, depending on the case whether the urethane resin is cross-linked or not, the glass transition temperature may be influenced in some cases.

1.2.1.3. Acid Value

An acid value of the urethane resin is preferably 40 mgKOH/g or more. In addition, the acid value described above is preferably 100 mgKOH/g or less, more preferably 50 to 100 mgKOH/g, even more preferably 65 to 90 mgKOH/g, further preferably 70 to 85 mgKOH/g, and even further preferably 75 to 83 mgKOH/g. Since the acid value of the urethane resin is 50 mgKOH/g or more, the dispersion stability of the urethane resin tends to be further improved, and the laminate strength thereof tends to be further improved. In addition, since the acid value of the urethane resin is 100 mgKOH/g or less, the blocking resistance tends to be further improved.

The acid value of the urethane resin can be measured by a titration method. The acid value is calculated by applying a value measured using AT610 (trade name) manufactured by Kyoto Electronics Manufacturing Co., Ltd.) to the following equation (1). In addition, by a colloid titration method using a potential difference, the acid value of a high molecular weight material dissolved in tetrahydrofuran can be measured. As a titration reagent in this case, an ethanol solution of sodium hydroxide may be used.

$$\text{Acid Value (mg/g)} = (EP1 - BL1) \times FA1 \times C1 \times K1/\text{SIZE} \quad (1)$$

In the above equation, EP1 represents a titration amount (mL), BL1 represents a blank value (0.0 mL), FA1 represent a factor of a titration liquid (1.00), C1 represents a concentration based value (5.611 mg/mL) (0.1 mol/L, corresponding to an amount of potassium hydroxide in 1 mL), K1 represents a factor (1), and SIZE represents a sample amount (g).

The acid of the urethane resin can be adjusted by adjusting an introduction amount of acid groups (acidic groups) in the urethane resin. As the acid group, for example, a carboxy group or a sulfo group may be mentioned. For example, by adjusting a content of a skeleton derived from a carboxy group-containing glycol (acid group-containing polyol such as dimethylolpropionic acid), the acid value can be changed.

1.2.1.4. Resin Composition

The urethane resin is a high molecular weight material including at least one type of group selected from an urethane bond (urethane group) obtained by a reaction between an isocyanate group of a polyisocyanate and a hydroxy group of a polyol and an urea bond (urea group) obtained by a reaction between an isocyanate group of a polyisocyanate and an amino group of a polyamine and may have either a linear structure or a branched structure. In addition, the urethane resin may be a resin obtained by polymerization using, if needed, a polyol or a polyamine functioning as a cross-linking agent or a chain extender.

In addition, a molecular chain present between the isocyanate groups of the polyisocyanate, a molecular chain present between the hydroxy groups of the polyol, and a molecular chain present between the amino groups of the polyamine form portions other than the urethane bonds or the urea bonds which are obtained when a polyurethane is formed. In this specification, the portions other than the urethane bonds or the urea bonds of the polyurethane may be entirely or partially called skeletons in some cases. The skeletons each may have either a linear structure or a branched structure.

The urethane resin of this embodiment preferably includes in its skeleton, one of an alicyclic structure and an aromatic ring structure. In the case described above, the abrasion resistance is preferably more superior. The alicyclic structure and the aromatic ring structure each may be the structure derived from either a polyisocyanate or a polyol. The urethane resin of this embodiment preferably includes an aliphatic structure and one of an alicyclic structure and an aromatic ring structure and more preferably has a structure in which an alkylene group is provided between an urethane group and one of an alicyclic structure and an aromatic ring structure. By the structure as described above, the THF soluble component in a two-hour dissolution time and the THF soluble component in a 15-minute dissolution time can be controlled. In particular, the THF soluble component in a 15-minute dissolution time is likely to be adjusted in the above preferable range.

The urethane resin may have a structure cross-linked by a cross-linking component. A component of the urethane resin having the cross-linked structure as described above is a component insoluble in THF. When the degree of the cross-linked structure is adjusted, the THF soluble component can be controlled.

In addition, the urethane resin may include at least one bond other than the urethane bond and the urea bond, and as the bond described above, for example, there may be mentioned an urea bond generated by a reaction between a plurality of isocyanate bonds and water, a biuret bond generated by a reaction between an urea bond and an isocyanate group, an allophanate bond generated by a reaction between an urethane bond and an isocyanate group, an uretdione bond generated by dimerization of isocyanate groups, or an isocyanurate bond generated by trimerization of isocyanate groups. Those bonds can be controlled by a reaction temperature and the like so as to be positively generated or not generated. Since at least one of the bonds as described above is included, the adhesive property to a recording medium is improved, a film strength is increased, and the abrasion resistance tends to be further improved.

1.2.1.4.1. Polyisocyanate

Although the polyisocyanate is not particularly limited, for example, there may be mentioned an aromatic polyisocyanate having 8 to 26 carbon atoms, an aliphatic polyisocyanate having 4 to 22 carbon atoms, an alicyclic polyisocyanate having 8 to 18 carbon atoms, an aromatic-aliphatic polyisocyanate having 10 to 18 carbon atoms, or a modified product derived from one of those polyisocyanates mentioned above, the polyisocyanates each having 2 or 3 isocyanate groups or more. The polyisocyanates may be used alone, or at least two types thereof may be used in combination.

Although the aromatic polyisocyanate is not particularly limited, for example, there may be mentioned 1,3- or 1,4-phenylene diisocyanate, 2,4- or 2,6-tolylene diisocyanate (hereinafter, tolylene diisocyanate is abbreviated as TDI), crude TDI, 4,4'- or 2,4'-diphenylmethane diisocyanate (hereinafter, diphenylmethane diisocyanate is abbreviated as MDI), crude MDI, polyaryl polyisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, 4,4',4''-triphenylmethane triisocyanate, or m- or p-isocyanatophenylsulfonyl isocyanate.

Although the aliphatic polyisocyanate is not particularly limited, for example, there may be mentioned ethylene diisocyanate, tetramethylene diisocyanate, hexamethylene diisocyanate (hereinafter, abbreviated as HDI), dodecamethylene diisocyanate, 1,6,11-undecane triisocyanate, 2,2,4-trimethylhexamethylene diisocyanate, 2,4,4-trimethylhexamethylene diisocyanate, lysine diisocyanate, 2,6-diisocyanatomethyl caproate, bis(2-isocyanatoethyl) fumarate, bis(2-isocyanatoethyl)carbonate, 2-isocyanatoethyl-2,6-diisocyanatohexanoate, 2-methylpentane-1,5-diisocyanate, or 3-methyl-1,5-pentanediisocyanate.

Although the alicyclic polyisocyanate is not particularly limited, for example, there may be mentioned isophorone diisocyanate (hereinafter, abbreviated as IPDI in some cases), 4,4-dicyclohexylmethane diisocyanate (hereinafter, abbreviated as hydrogenated MDI in some cases), cyclohexane-1,2-diylbis(methylene)diisocyanate (hereinafter, abbreviated as hydrogenated XDI in some cases), cyclohexylene diisocyanate, methylcyclohexylene diisocyanate, bis(2-isocyanatoethyl)-4-cyclohexene-1,2-dicarboxylate, 1,4-cyclohexane diisocyanate, or 2,5- or 2,6-norbornane diisocyanate.

Although the aromatic-aliphatic polyisocyanate is not particularly limited, for example, m- or p-xylylene diisocyanate or α,α,α',α'-tetramethylxylylene diisocyanate may be mentioned.

As the modified product described above, for example, there may be mentioned a modified product of the above polyisocyanate (such as an urethane group-, a carbodiimide group-, an allophanate group-, an urea group-, a biuret group-, an uretdione group-, an uretoimine group-, an isocyanurate group-, or an oxazolidone group-containing modified product; a content of a free isocyanate group being 8 to 33 percent by mass, preferably 10 to 30 percent by mass, and particularly preferably 12 to 29 percent by mass) or a modified product of a polyisocyanate, such as a modified MDI (such as an urethane modified MDI, a carbodiimide modified MDI, or a trihydrocarbyl phosphate modified MDI), an urethane modified TDI, a biuret modified HDI, an isocyanurate modified HDI, or an isocyanurate modified IPDI.

The modified product described above includes a polyfunctional isocyanate in the form of a dimer or more obtained from the above polyisocyanates in arbitrary combination. Since having a structure formed from at least two polyisocyanate molecules and being able to react with an OH group and/or an $NH_2$ group of a polyol and/or a polyamine, the polyfunctional polyisocyanate is a compound having at least two isocyanate groups at molecular terminals thereof. In the polyfunctional polyisocyanate described above, at least one selected from the group consisting of an allophanate structure, an uretdione structure, an isocyanurate structure, and a biuret structure may be included.

Among the polyisocyanates, an aliphatic polyisocyanate and an alicyclic polyisocyanate are preferable, and hexamethylene diisocyanate, isophorone diisocyanate, or cyclohexane-1,2-diylbis(methylene)diisocyanate is more preferable. When those polyisocyanates are used, the glass transition temperature can be decreased, and in addition, a flexibility of the urethane resin can be increased. Hence, the blocking resistance and the laminate strength can be further improved.

1.2.1.4.2. Polyol

Although the polyol is not particularly limited, for example, a polyether polyol, an alkylene glycol, a polyester polyol, or a polycarbonate diol may be mentioned.

Although the polyether polyol is not particularly limited, for example, there may be mentioned an aliphatic polyether polyol, such as a polyethylene glycol (polyoxyethylene glycol), a polypropylene glycol (polyoxypropylene glycol), a polytetramethylene glycol (polyoxytetramethylene glycol), a polyoxyethylene/propylene polyol, or a polyoxypropylene triol; or an aromatic polyether polyol including a polyol having a bisphenol A skeleton, such as an EO adduct or a PO adduct of bisphenol A, or an EO adduct or a PO adduct of resorcin.

A weight average molecular weight of the polyether polyol is preferably 250 to 5,000 and more preferably 500 to 4,000. Since the weight average molecular weight of the polyether polyol is in the range described above, the balance between the strength and the flexibility of an ink coating film is improved, and hence, the blocking resistance and laminate strength tend to be further improved.

A content of the polyether polyol with respect to the total mass of polyols to be used is preferably 50 percent by mass or more. Since the content of the polyether polyol is in the range described above, the blocking resistance and the laminate strength tend to be further improved.

As the alkylene glycol, the following material may be used. For example, there may be mentioned ethylene glycol, diethylene glycol, triethylene glycol, a polyethylene glycol, 1,2-propylene glycol, 1,3-propanediol, tripropylene glycol, a polypropylene glycol, a (poly)tetramethylene glycol, hexamethylene glycol, tetramethylene glycol, neopentyl glycol, 1,2-butanediol, 1,3-butanediol, 1,4-butanediol, 1,2-pentanediol, 1,5-pentanediol, 1,2-hexanediol, 1,6-hexanediol, 3-methyl-1,5-pentanediol, 1,2-cyclohexanediol, 1,4-cyclohexanediol, 1,4-cyclohexanedimethanol, 4,4-dihydroxyphenyl propane, 4,4-dihydroxyphenyl methane, glycerin, trimethylolethane, trimethylolpropane, 1,2,5-hexanetriol, 1,2,6-hexanetriol, pentaerythritol, trimethylolmelamine, a polyoxypropylene triol, dimethyl-1,3-pentanediol, diethyl-1,3-pentanediol, dipropyl-1,3-pentanediol, dibutyl-1,3-pentanediol, or 2-butyl-2-ethyl-1,3-propanediol. Among those mentioned above, 1,4-cyclohexanediol, 1,4-cyclohexanedimethanol, 4,4-dihydroxyphenyl propane, 4,4-dihydroxyphenyl methane, dimethyl-1,3-pentanediol, diethyl-1,3-pentanediol, dipropyl-1,3-pentanediol, dibutyl-1,3-pentanediol, or 2-butyl-2-ethyl-1,3-propanediol is preferable.

When the alkylene glycol is used as a raw material of the urethane resin, an alkylene glycol having a small molecular weight intrudes in a three-dimensional net structure formed in the urethane resin to form an urethane bond by a reaction with an isocyanate, and as a result, a tougher film may be obtained in some cases. Accordingly, since the strength of a film (image) is increased, the blocking resistance and the laminate strength of a printed matter may be further improved in some cases. However, the addition amount of the alkylene glycol described above is preferably 10% or less and more preferably 5% or less.

Since the molecular weight of the alkylene glycol itself is low, when a hydroxy group thereof reacts with an isocyanate group, the number of urethane bonds is excessively increased, the flexibility is degraded, and the blocking resistance and the laminate strength tend to be decreased in some cases. Hence, those alkylene glycols basically form urethane groups and/or allophanate groups each of which functions as a hard segment of the urethane resin. In addition, the alkylene glycol may also be used as a component which reacts with a polyfunctional polyisocyanate, a chain extender, a cross-linking agent, or the like and may also be used to control the physical properties of the urethane resin.

In addition, when the polyol is used as a raw material of the urethane resin, a weight average molecular weight of the polyol is preferably 500 to 3,000. When the weight average molecular weight thereof is 500 or more, a density of the urethane bonds in the urethane resin is not excessively increased, and a rigidity of the molecular chain derived from the polyol can be suppressed. Accordingly, the flexibility of the urethane resin is increased, and the blocking resistance and the laminate strength of the printed matter are improved. In addition, when the weight average molecular weight of the polyol which reacts with a polyisocyanate is 3,000 or less, the density of the urethane bonds in the urethane resin is not excessively decreased, a stretchability of the molecular chain derived from the polyol is not excessively increased, and the flexibility of the urethane resin can be suppressed. Hence, a tacking property is not likely to be generated, and the blocking resistance and the laminate strength of the printed matter can be secured. Accordingly, when the weight average molecular weight of the polyol is set to 500 to 3,000, the balance between the strength and the flexibility of a film (image) formed by the urethane resin is improved, and as a result, the blocking resistance and the laminate strength of the printed matter can be improved.

As the polyester polyol, for example, an acid ester may be mentioned. As an acid component to form the acid ester, for example, there may be mentioned an aliphatic dicarboxylic acid, such as malonic acid, succinic acid, tartaric acid, oxalic acid, glutaric acid, adipic acid, pimelic acid, suberic acid, azelaic acid, sebacic acid, an alkyl succinic acid, linoleic acid, maleic acid, fumaric acid, mesaconic acid, citraconic acid, or itaconic acid; an aromatic dicarboxylic acid, such as phthalic acid, naphthalene dicarboxylic acid, or biphenyl dicarboxylic acid; or an alicyclic dicarboxylic acid, such as tetrahydrophthalic acid or a hydrogenated aromatic dicarboxylic acid. An anhydride, a salt, an alkyl ester, an acid halide, or the like of one of the acid components described above may also be used as the acid component. In addition, as an alcohol component to form the acid ester, the above diol compounds each may also be mentioned by way of example, and although not particularly limited, an alcohol component having a low solubility in water is preferable.

The polycarbonate diol includes a molecular chain having two hydroxy groups and carbonate bonds. As one example of a polycarbonate diol to be used as a part of the polyol in this embodiment, for example, a polycarbonate diol may be mentioned which is obtained by a reaction among a carbonate component, such as an alkylene carbonate, a diaryl carbonate, or a dialkyl carbonate, phosgene, and an aliphatic polyol component, and furthermore, an alkanediol-based polycarbonate diol, such as a polyhexamethylene carbonate diol, may also be mentioned. When the polycarbonate diol is used as a starting material of the urethane resin, a heat resistance and a hydrolysis resistance of an urethane resin to be produced tend to be improved.

Since the polycarbonate diol is used as the polyol, the urethane resin has a skeleton derived from the polycarbonate diol, and hence, the blocking resistance and the laminate strength of a printed matter to be obtained can be further improved.

A preferable polycarbonate diol as the raw material of the urethane resin of this embodiment includes, in general, two hydroxy groups in its molecule and can be obtained by an ester exchange reaction of a diol compound and a carbonate ester. As the diol compound described above, for example, there may be mentioned 1,4-butanediol, 1,3-butanediol, 1,2-butanediol, 1,5-pentanediol, 1,2-pentanediol, 1,6-hexanediol, 1,5-hexanediol, 1,2-hexanediol, 1,7-heptanediol, 1,8-octanediol, 1,2-octanediol, 1,9-nonanediol, 1,10-decanediol, neopentyl glycol, 4-methyl-1,5-pentanediol, 2-methyl-1,3-propanediol, 2-methyl-1,8-octanediol, 2-isopropyl-1,4-butanediol, 2-ethyl-1,6-hexanediol, 3-methyl-1,5-pentanediol, 2,4-dimethyl-1,5-pentanediol, 2,4-diethyl-1,5-pentanediol, 1,3-butanediol, 2-ethyl-1,3-hexanediol, 2-butyl-2-ethyl-1,3-propanediol, 1,4-cyclohexanedimethanol, 1,3-cyclohexanediol, or 1,4-cyclohexanediol. Those diols mentioned above may be used alone, or at least two types thereof may be used in combination. In addition, among the diols mentioned above, neopentyl glycol, 4-methyl-1,5-pentanediol, 2-methyl-1,3-propanediol, 2-methyl-1,8-octanediol, 2-isopropyl-1,4-butanediol, 2-ethyl-1,6-hexanediol, 3-methyl-1,5-pentanediol, 2,4-dimethyl-1,5-pentanediol, or 2,4-diethyl-1,5-pentanediol, each of which is not likely to be crystallized, is more preferable.

As long as the effect of the present disclosure is not deteriorated, although a carbonate ester which can be used for production of the polycarbonate diol is not particularly limited, for example, a dialkyl carbonate, a diaryl carbonate, or an alkylene carbonate may be mentioned. In view of reactivity, among those mentioned above, a diaryl carbonate is preferable. As a particular example of the carbonate compound, for example, dimethyl carbonate, diethyl carbonate, dibutyl carbonate, diphenyl carbonate, or ethylene carbonate may be mentioned, and diphenyl carbonate is more preferable.

The acid group is more preferably present in a polyol molecule which forms the urethane resin. In this case, the acid value can be easily set to 40 to 100 mgKOH/g. In addition, since the fixing property of an image to be formed to a recording medium can be further improved, the blocking resistance and the laminate strength are excellent.

As an acid group-containing diol, for example, dimethylolacetic acid, dimethylolpropionic acid, or dimethylolbutanoic acid may be mentioned. As the acid group, as described above, an organic acid group may be mentioned, and in particular, a carboxy group is mentioned. Furthermore, among those mentioned above, dimethylolpropionic acid and dimethylolbutanoic acid are preferable. When the white ink composition of this embodiment is an aqueous ink composition, the urethane resin is more preferably formed by polymerization using the acid group-containing diol as described above as the raw material. In the case described above, in particular, the acid value can be easily set to 40 to 100 mgKOH/g. In addition, since the fixing property of an image to be formed to a recording medium can be further improved, the blocking resistance and the laminate strength are excellent.

The urethane resin obtained by polymerization of the components as described above is primarily formed of two types of segments, that is, hard segments and soft segments. The hard segment is formed of a polyisocyanate, a short chain polyol, a polyamine, a cross-linking agent, a chain extender, and the like and contributes primarily to the strength of the urethane resin. On the other hand, the soft segment is formed of a long chain polyol and the like and contributes primarily to the flexibility of the resin. In addition, in the film of the white ink composition adhered to a recording medium which is formed by the urethane resin as described above, since the hard segments and the soft segments form a microphase separated structure, the strength and the flexibility can be simultaneously obtained, and as a result, a high elasticity is obtained. The characteristics of the film as described above contribute to the improvement in blocking resistance and laminate strength of the printed matter.

1.2.1.4.3. Polyamine

As the raw material of the urethane resin, a polyamine may also be included. Although the polyamine is not particularly limited as long as having at least two amino groups, a polyamine having a high hydrophobic property is preferable. Since the raw material includes a polyamine, the urethane resin has at least one urea group.

As the polyamine, an aliphatic diamine or an aromatic diamine may be used. That is, the urethane resin may include at least one selected from a skeleton derived from an aliphatic diamine and a skeleton derived from an aromatic diamine. According to the white ink composition as described above, the flexibility of a solidified material of the white ink composition is further improved, and hence, the blocking resistance and the laminate strength of a printed matter can be further improved.

In addition, as the polyamine, the urethane resin may use a polyamine having 1 to 10 carbon atoms. That is, the urethane resin may include a skeleton derived from a polyamine having 1 to 10 carbon atoms. According to the white ink composition as described above, the flexibility of a solidified material of the white ink composition is further improved, and hence, the blocking resistance and the laminate strength of the printed matter can be further improved.

As the polyamine, for example, there may be mentioned an aliphatic diamine, such as ethylenediamine, propylenediamine, 2,2-dimethyl-1,3-propanediamine, 2-methyl-1,5-pentanediamine, trimethylhexanediamine, 2-butyl-2-ethyl-1,5-pentanediamine, 1,8-octanediamine, 1,9-nonanediamine, 1,10-decanediamine, isophoronediamine, or bicycloheptanedimethaneamine; diethylenetriamine, hexylenediamine, triethylenetetramine, tetraethylenepentamine, xylylenediamine, diphenylmethanediamine, hydrogenated diphenylmethanediamine, hydrazine, a polyamide polyamine, a polyethylene polyimine, 1-amino-3-aminomethyl-3,5,5-trimethylcyclohexane, dicyclohexylmethanediamine, bicycloheptanedimethaneamine, mensendiamine, diaminodicyclohexylmethane, isopropylidene cyclohexyl-4,4'-diamine, 1,4-diaminocyclohexane, or 1,3-bisaminomethylcyclohexane.

Among those mentioned above, a polyamine having 1 to 10 carbon atoms is preferable. An aliphatic diamine, such as 2,2-dimethyl-1,3-propanediamine, 2-methyl-1,5-pentanediamine, trimethylhexanediamine, 2-butyl-2-ethyl-1,5-pentanediamine, 1,8-octanediamine, 1,9-nonanediamine, 1,10-decanediamine, isophoronediamine, or bicycloheptanedimethaneamine, is preferable, and isophoronediamine or bicycloheptanedimethaneamine is particularly preferable.

In addition, a common compound to be used as the polyamine has a molecular weight similar to that of a short chain polyol in many cases and basically forms an urea group or a biuret group functioning as a hard segment of the urethane resin.

In addition, although the polyamine may also be used as a component to react with a polyfunctional polyisocyanate, a chain extender, a cross-linking agent, or the like, when an isocyanate group is allowed to react with an amino group, an urea bond is formed. Hence, in the case in which the polyamine is used, when a usage thereof is determined to obtain a desired ratio of urea groups/urethane groups in the urethane resin, the physical properties of the urethane resin can be controlled.

As a method to adjust the ratio of urea groups/urethane groups in the urethane resin, for example, there may be mentioned a method in which while the equivalent of an amino group of an amine compound (polyamine) is taken into consideration for synthesis of the urethane resin, the usage of the polyamine is adjusted or a method in which when the urethane resin is phase-inverted in water, a remaining rate of an unreacted isocyanate group is adjusted.

As the method to adjust the usage of a polyamine for synthesis of the urethane resin, an amount of the urea bond generated by a reaction between a polyamine and an isocyanate group is controlled. First, at least two types of urethane resins are synthesized by changing the usage of a polyamine, and a ratio of urea groups/urethane groups is calculated. From the molar ratios thus obtained, the relationship between the usage of a polyamine and the molar ratio is investigated to form a calibration curve, and by using this calibration curve, the usage of a polyamine necessary for the synthesis of an urethane resin having a desired molar ratio is determined. Incidentally, the reason the calibration curve is formed in advance is that even if the same type of polyamine is used, when other components are different, a reaction rate may be changed in some cases, and hence, the same molar ratio may not be always obtained.

In addition, when the urethane resin is phase-inverted in water, as the method to adjust a remaining rate of an unreacted isocyanate group, during a synthetic reaction of the urethane resin, first, the remaining rate of an isocyanate group to the usage of a polyisocyanate is confirmed by Fourier transformation infrared spectroscopy (FT-IR). The remaining rate of an isocyanate group can be adjusted by changing a reaction time and/or the usage of a polyisocyanate.

1.2.1.4.4. Cross-Linking Agent and Chain Extender

The urethane resin of this embodiment may contain a cross-linking agent and/or a chain extender. The cross-linking agent is used for prepolymer synthesis, and the chain extender is used for a chain extension reaction after the prepolymer synthesis. In accordance with application, such as the cross-linking, the chain extension, or the like, the cross-linking agent and the chain extender are appropriately selected from the above polyisocyanates, polyols, and polyamines.

As the chain extender, for example, among the above polyisocyanates, a compound which has no urethane bonds and which reacts by its isocyanate groups may be mentioned. As a compound which can be used as the chain extender, for example, the above polyols and polyamines may be mentioned. In addition, as the chain extender, a compound which is able to cross-link an urethane resin may also be used. As the compound which can be used as the chain extender, a low molecular weight polyol or polyamine having a number average molecular weight of less than 500 may be mentioned.

In addition, as the cross-linking agent, among a polyisocyanate, a polyol, and a polyamine, a compound having at least three functions may be mentioned. As a polyfunctional polyisocyanate having at least three functions, for example, a polyisocyanate having an isocyanurate structure or a polyisocyanate having an allophanate or a biuret structure may be mentioned. As the polyol, for example, glycerin, trimethylolpropane, pentaerythritol, or a polyoxypropylene triol may be used. As the polyamine having at least three functions, a trialcohol amine, such as triethanolamine or triisopropanolamine, or an amine, such as diethylenetriamine or tetraethylenepentamine, having at least three amino groups may be mentioned.

In addition, whether the urethane resin is cross-linked or not may be judged by a gel fraction obtained by calculation of a ratio between a gel component and a sol component using a phenomenon in which an urethane resin having a cross-linked structure is not dissolved in a solvent but is swelled. The gel fraction is an index of a cross-linking degree measured from a solubility of a solidified urethane resin, and as the cross-linking degree is higher, the gel fraction tends to be higher.

In general, a decrease in continuous printing stability is generated primarily by evaporation of water from a nozzle of an ink jet head. In order to increase the continuous printing stability, even when interaction between an urethane resin and a pigment is increased by evaporation of a certain amount of water from an ink composition present in the vicinity of the nozzle of the ink jet head, as one of measures against the case described above, it is important to maintain a state in which the pigment and the resin are not aggregated and are stably dispersed. Although having a relatively low acid value, since the urethane resin of this embodiment has a structure formed of the above polyisocyanate, a three-dimensionally complicated and entangled structure is formed. Hence, even if water evaporation proceeds, repulsion between the urethane resin and the pigment is likely to be generated by an electrostatic action and/or a repulsive force, and as a result, a stable dispersion structure is likely to be obtained.

In this specification, the skeleton of the urethane resin indicates a molecular chain between the functional groups. Hence, the urethane resin of this embodiment includes skeletons derived from molecular chains of raw materials, such as a polyisocyanate, a polyol, and a polyamine. Although other skeletons are not particularly limited, for example, substituted or unsubstituted, saturated or unsaturated, and aliphatic, alicyclic or aromatic chains may be mentioned, and those chains may include a carbonate bond, an ester bond, an amide bond, and/or the like. In addition, the types and the number of substituents in the skeleton described above are not particularly limited, and for example, an alkyl group, a hydroxy group, a carboxy group, an amino group, a sulfonyl group, and a phosphonyl group may be included.

1.2.1.5. Synthesis of Urethane Resin

The urethane resin used for the white ink composition of this embodiment may be synthesized using a method known as a polymerization method of an urethane resin. Hereinafter, the synthesis will be described with reference to examples. A polyisocyanate and a compound (a polyol and, if needed, a polyamine or the like) which reacts therewith are allowed to react with each other in amounts so that the number of isocyanate groups is larger, and a prepolymer having isocyanate groups at molecular terminals is obtained by polymerization. In this case, the reaction is preferably performed in an organic solvent. In addition, if needed, an organic solvent, such as methyl ethyl ketone, acetone, or tetrahydrofuran, having a boiling point of 100° C. or less may be used. In general, this method is called a prepolymer method.

When an acid group-containing diol is used as a raw material, an acid group of the prepolymer is neutralized by an organic base nuetralizer, such as N,N-dimethylethanolamine, N,N-diethylethanolamine, diethanolamine, triethanolamine, triisopropanolamine, trimethylamine, or triethylamine or an inorganic base neutralizer, such as sodium hydroxide, potassium hydroxide, or ammonium. Since the dispersion stability of the urethane resin is improved, a neutralizer, such as sodium hydroxide or potassium hydroxide, containing an alkali metal is preferably used. With respect to one mole of the acid group of the prepolymer, when at least one of those neutralizers is used in an amount of preferably 0.5 to 1.0 mole and more preferably 0.8 to 1.0 mole, the viscosity is not likely to be increased, and the workability is improved.

Subsequently, the prepolymer is added in a liquid containing a chain extender and/or a cross-linking agent, so that a chain extension reaction and/or a cross-linking reaction is performed. Next, when an organic solvent is used, the organic solvent is removed using an evaporator or the like, so that a dispersion of the urethane resin is obtained. The chain extension reaction and/or the cross-linking reaction is preferably performed in water (in aqueous solvent). The aqueous solvent is a liquid at least including water as a primary solvent.

As a catalyst used for the polymerization reaction of the urethane resin, a titanium catalyst, an aluminum catalyst, a zirconium catalyst, an antimony catalyst, a germanium catalyst, a bismuth catalyst, or a metal complex-based catalyst is preferable. In particular, as the titanium catalyst, a tetraalkyl titanate, such as tetrabutyl titanate or tetramethyl titanate, or a metal oxalate, such as titanium potassium oxalate, is preferable.

Although other catalysts are not particularly limited as long as being known catalysts, for example, a Ti compound, such as dibutyl tin oxide or dibutyl tin dilaurate, may be mentioned. As a non-heavy metal catalyst, an acetylacetonato complex of a transition metal, such as titanium, iron, copper, zirconium, nickel, cobalt, or manganese, having a urethanization activity has been known for a long time. Because of recent consideration of environmental protection, a low toxic catalyst which can replace a heavy metal catalyst has been desired, and in particular, much attention has been paid on a high urethanization activity of a titanium/zirconium compound.

The urethane resin of this embodiment is preferably obtained by a method in which after a reaction among an isocyanate, a polytetramethylene glycol, and an acid group-containing polyol is performed in an organic solvent, chain extension of prepolymers thus obtained is performed with a polyamine in an aqueous solvent.

Accordingly, the urethane resin can be easily and stably produced, and a white ink composition can be produced which is able to easily form a printed matter having an image excellent in blocking resistance and laminate strength.

1.2.1.6. Analysis of Urethane Resin

The composition of the urethane resin, the structure of the polyisocyanate, and the acid value of the urethane resin can be analyzed by the following methods.

First, a method to extract an urethane resin from an ink containing an urethane resin will be described. When a pigment is contained in a white ink composition, by using an organic solvent (such as acetone or methyl ethyl ketone) which does not dissolve the pigment but dissolves the urethane resin, the urethane resin can be extracted from the white ink composition. In addition, when the white ink composition is fractionated by a super centrifugal method, and a supernatant thereof is processed by acid deposition using an acid, the urethane resins can also be extracted.

(A) Composition of Urethane Resin

The urethane resin is dissolved in a deuterated dimethylsulfoxide (DMSO-d6) to form a sample, and from a position of a peak obtained by an analysis using a proton nuclear magnetic resonance (1H-NMR) method or a carbon-13 nuclear magnetic resonance (13C-NMR) method, the types of polyisocyanate, polyol, polyamine, and the like can be confirmed. Furthermore, from a ratio between integrated values of peaks of chemical shifts of individual components, a composition ratio can also be calculated. In addition, when the urethane resin is analyzed by a pyrolysis gas chromatography (GC-MS), the types of polyisocyanate, polyol, polyamine, and the like can also be confirmed. In addition, when the analysis is performed by a carbon-13 nuclear magnetic resonance (13C-NMR) method, the number of repeating units and the number average molecular weight of a long chain polyol can also be confirmed.

(B) Structure of Polyisocyanate

From an infrared absorption spectrum of the urethane resin obtained by analysis using Fourier transformation infrared spectroscopy (FT-IR), the structure of the polyisocyanate can be confirmed. The primary absorptions are as described below. The allophanate structure shows an NH stretching vibration absorption at 3,300 $cm^{-1}$ and two C=O stretching vibration absorptions at 1,750 to 1,710 $cm^{-1}$ and at 1,708 to 1,653 $cm^{-1}$. The uretdione structure shows a C=O stretching vibration absorption at 1,780 to 1,755 $cm^{-1}$ and an absorption at 1,420 to 1,400 $cm^{-1}$ based on an uretdione ring. The isocyanurate structure shows a C=O stretching vibration absorption at 1,720 to 1,690 $cm^{-1}$ and an absorption at 1,428 to 1,406 $cm^{-1}$ based on an isocyanurate ring. The biuret structure shows a C=O stretching vibration absorption at 1,720 to 1,690 $cm^{-1}$.

1.3. Water

A content of water with respect to the total mass of the ink composition is preferably 30 percent by mass or more, more preferably 30 to 95 percent by mass, even more preferably 30 to 70 percent by mass, further preferably 35 to 65 percent by mass, and even further preferably 40 to 60 percent by mass. In addition, in this embodiment, the "aqueous" indicates that the content of water is in the range described above.

1.4. Water-Soluble Organic Solvent

The white ink composition of this embodiment may contain a water-soluble organic solvent. Since the water-soluble organic solvent is contained, while the ejection stability of the ink composition by an ink jet method is improved, moisture evaporation from a recording head during a long storage can be effectively suppressed. In addition, for example, a permeability of the ink is improved, and an image excellent, for example, in image quality, abrasion resistance, and adhesive property can be obtained.

Although the water-soluble organic solvent is not particularly limited, for example, there may be mentioned a glycol ether-based organic solvent, a nitrogen-containing organic solvent, a polyol, an acyclic ester, or a cyclic ester. Among those mentioned above, a nitrogen-containing organic solvent, a glycol ether-based organic solvent, or a polyol is preferable. In particular, a nitrogen-containing organic solvent or a glycol ether-based organic solvent is preferable. The water-soluble organic solvents may be used alone, or at least two types thereof may be used in combination.

The water-soluble organic solvent preferably includes a solvent having a standard boiling point of 160° C. to 280° C. The standard boiling point of this solvent is preferably 170° C. to 280° C., more preferably 180° C. to 270° C., even more preferably 170° C. to 270° C., further preferably 190° C. to 270° C., and even further preferably 200° C. to 250° C. Since the standard boiling point is in the range described above, the abrasion resistance and the blocking resistance tend to be improved.

In addition, with respect to the total mass of the white ink composition, an organic solvent having a standard boiling point of more than 280.0° C. is preferably not contained in an amount of more than 1.0 percent by mass (the content is 1.0 percent by mass or less) and is contained in an amount of more preferably 0.5 percent by mass or less and even more preferably 0.3 percent by mass or less. Furthermore, the organic solvent described above may be not contained, that is, the content thereof may be 0.0 percent by mass. Accordingly, a drying property of the white ink composition adhered to a recording medium is improved, and the abrasion resistance and the blocking resistance tend to be improved.

In addition, as the organic solvent having a standard boiling point of more than 280.0° C., for example, glycerin or a polyethylene glycol monomethyl ether may be mentioned.

The glycol ether-based organic solvent described above is excellent in resin solubility and permeability, and the abrasion resistance and the laminate strength of a coating film to be obtained tend to be improved. The glycol ether-based organic solvent includes a monoether or a diether of an alkylene glycol or a polyalkylene glycol. As the alkylene glycol, an alkylene glycol having 4 carbon atoms or less is preferable, and as the polyalkylene glycol, a condensate formed by intermolecular condensation between hydroxy groups of the alkylene glycols is preferable. In the case of the condensate, the number of condensations is preferably 2 to 4. In addition, as the ether, for example, an alkyl ether or an aromatic ether may be mentioned, and among those ethers, an alkyl ether is preferable. The alkyl of the alkyl ether preferably has 1 to 4 carbon atoms. Furthermore, a monoether is preferable.

Although the glycol ether-based organic solvent as described above is not particularly limited, for example, there may be mentioned ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, 3-methoxy-3-methyl-1-butanol, ethylene glycol dimethyl ether, ethylene glycol diethyl ether, ethylene glycol dibutyl ether, diethylene glycol dimethyl ether, or diethylene glycol diethyl ether.

The number of carbon atoms of the glycol ether-based organic solvent is preferably 12 or less, more preferably 8 or less, and further preferably 4 to 8. Accordingly, the abrasion resistance and the laminate strength of an ink coating film to be obtained tend to be improved. The number of carbon atoms is the number of all carbon atoms in the molecule of the glycol ether-based organic solvent.

A content of the glycol ether-based organic solvent with respect to the total mass of the white ink composition is preferably 1 to 40 percent by mass, more preferably 2 to 30 percent by mass, and further preferably 5 to 10 percent by mass.

The nitrogen-containing organic solvent is not particularly limited as long as containing a nitrogen atom in its molecule. The nitrogen-containing organic solvent functions as a preferable resin dissolving agent, and the abrasion resistance and the laminate strength of a coating film to be obtained tend to be improved. As the nitrogen-containing organic solvent, for example, a cyclic amide or an acyclic amide may be mentioned. Among those amides, a cyclic amide is more preferable in terms of laminate strength. In addition, in terms of blocking resistance, an acyclic amide is more preferable.

Although the cyclic amide is not particularly limited as long as having a cyclic structure, for example, there may be mentioned a pyrrolidone, such as 2-pyrrolidone, N-methyl-2-pyrrolidone, N-ethyl-2-pyrrolidone, N-vinyl-2-pyrrolidone, N-butyl-2-pyrrolidone, or 5-methyl-2-pyrrolidone.

Although the acyclic amide is not particularly limited as long as having an acyclic structure, for example, there may be mentioned 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

A content of the nitrogen-containing organic solvent with respect to the total mass of the white ink composition is preferably 1 to 40 percent by mass, more preferably 2 to 30 percent by mass, further preferably 3 to 20 percent by mass, and particularly preferably 5 to 10 percent by mass.

The polyol described above is a compound having at least two hydroxy groups in its molecule. The polyol has an excellent moisture retaining property of an ink and an excellent function as a permeating solvent to a recording medium, and a wettability of the ink composition to the recording medium is further improved.

Among those polyols, an alkane polyol having at least two hydroxy groups or a condensate formed by intermolecular condensation between hydroxy groups of the alkane polyols is preferably mentioned. The number of condensations of the condensate is preferably 2 to 4. The number of hydroxy groups of the polyol is preferably 2 to 5 and more preferably 2 to 3. The number of carbon atoms of the condensate described above or the alkane polyol which is not the condensate is preferably 4 or less. In this case, the moisture retaining property is preferably further improved.

In addition, among the polyols, an alkanediol having 5 carbon atoms or more is preferable since having a more excellent function as the permeating solvent to a recording medium. The number of carbon atoms of the alkanediol is preferably 5 to 10. In addition, a 1,2-alkanediol is particularly preferable.

Although the polyol as described above is not particularly limited, for example, there may be mentioned ethylene glycol, propylene glycol, 1,2-propanediol, 1,2-butanediol, 1,3-propanediol, 1,4-butanediol, diethylene glycol, triethylene glycol, dipropylene glycol, trimethylolpropane, glycerin, 1,2-pentanediol, 1,2-hexanediol, 1,2-oxtanediol, 1,6-hexanediol, 2-methyl-2,4-pentanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, or 2-methylpentane-2,4-diol.

A content of the polyol with respect to the total mass of the white ink composition is preferably 1 to 40 percent by mass, more preferably 2 to 30 percent by mass, and further preferably 5 to 25 percent by mass.

A content of the alkanediol having at least 5 carbon atoms with respect to the total mass of the white ink composition is preferably 1 to 40 percent by mass, more preferably 2 to 30 percent by mass, and further preferably 5 to 10 percent by mass.

When the ink contains one of the glycol ether-based organic solvent and the alkanediol having at least 5 carbon atoms, the ink preferably has an excellent permeability to a recording medium.

Although the acyclic ester described above is not particularly limited, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

As the cyclic ester described above, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone; or a compound in which a hydrogen atom of a methylene group adjacent to the carbonyl group thereof is substituted by an alkyl group having 1 to 4 carbon atoms.

A content of the water-soluble organic solvent with respect to the total mass of the ink composition is preferably 1 to 50 percent by mass, more preferably 15 to 40 percent by mass, even more preferably 20 to 35 percent by mass, and further preferably 25 to 30 percent by mass. Since the content of the water-soluble organic solvent is in the range described above, for example, the abrasion resistance, the adhesive property, the moisture retaining property, and the permeability tend to be further improved.

1.5. Wax

Although the wax is not particularly limited, for example, waxes each obtained by copolymerization between an olefin and a diene may be mentioned. Among those waxes, a polyolefin wax emulsion is preferable. Since the polyolefin wax as described above is contained, the abrasion resistance and the blocking resistance tend to be further improved.

As an olefin forming the polyolefin wax, ethylene or an α-olefin having 3 to 12 carbon atoms may be mentioned. As the α-olefin having 3 to 12 carbon atoms, for example, propylene, 1-butene, 1-pentene, 3-methyl-1-butene, 1-hexene, 4-methyl-1-pentene, 3-methyl-1-pentent, 1-octene, 1-decene, or 1-dodecene may be mentioned. Among those mentioned above, an α-olefin having 3 to 10 carbon atoms is preferable, an α-olefin having 3 to 8 carbon atoms is more preferable, and propylene, 1-butene, 1-hexene, or 4-methyl-1-pentene is particularly preferable.

In addition, as the diene, for example, there may be mentioned butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene (5-vinyl bicyclo[2.2.1]hept-2-ene), dicyclopentadiene, 2-methyl-1,4-hexadiene, 2-methyl-1,6-octadiene, 7-methyl-1,6-octadiene, 4-ethylidene-8-methyl-1,7-nonadiene, or 5,9-dimethyl-1,4,8-decatriene. Among those mentioned above, vinyl norbornene, ethylidene norbornene, dicyclopentadiene, 1,4-hexadiene, butadiene, isoprene, 2-methyl-1,4-hexadiene, or 2-methyl-1,6-octadiene is preferable.

In addition, the polyolefin wax may be an oxidized polyolefin wax formed by oxidizing a polyolefin wax by a known method. The oxidized polyolefin wax may be produced such that, for example, while a polyolefin resin having a high molecular weight is adjusted to have a desired molecular weight by pyrolysis, chemical decomposition, or the like, oxygen atoms and the like are introduced in its molecule. The oxygen atoms introduced in the molecule form, for example, a carboxy group having a polarity or the like. In the present disclosure, since being easily emulsified in an aqueous solvent, an oxidized polyolefin wax is preferably used.

A content of the wax with respect to the total mass of the ink composition is preferably 0.2 to 5.0 percent by mass, more preferably 0.3 to 3.0 percent by mass, and further preferably 0.5 to 1.5 percent by mass. Since the content of the wax is in the range described above, the abrasion resistance and the blocking resistance tend to be further improved.

1.6. Surfactant

Although the surfactant is not particularly limited, for example, an acetylene glycol-based surfactant, a silicone-based surfactant, or a fluorine-based surfactant may be mentioned. The surfactants may be used alone, or at least two types thereof may be used in combination.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals Inc.); Olefine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.): or Acetylenol E00, E00P, E40, or E100 (trade name, manufactured by Kawaken Fine Chemicals Co., Ltd.).

Although the silicone-based surfactant is not particularly limited, for example, a polysiloxane-based compound may be preferably mentioned. Although the polysiloxane-based compound is not particularly limited, for example, a polyether-modified organosiloxane may be mentioned. As a commercially available product of the polyether-modified organosiloxane compound, for example, there may be mentioned BYK-306, BYK-307, BYK-333, BYK-341, BYK-345, BYK-346, or BYK-348 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

As the fluorine-based surfactant, a fluorine-modified polymer is preferably used, and as a particular example, for example, there may be mentioned BYK-3440 (manufactured by BYK Japan KK); Surflon S-241, S-242, or S-243 (trade name, manufactured by AGC SEIMI CHEMICAL CO., LTD.); or Ftergent M215M (manufactured by Neos Co., Ltd.).

A content of the surfactant with respect to the total mass of the ink composition is preferably 0.1 to 2.0 percent by mass, more preferably 0.2 to 1.5 percent by mass, and further preferably 0.3 to 1.0 percent by mass.

1.7. pH Adjuster

Although the pH adjuster is not particularly limited, for example, there may be mentioned an urea, an amine, a morpholine, a piperazine, an amino alcohol, such as triethanolamine, may be mentioned. As the urea, for example, there may be mentioned urea, ethylene urea, tetramethyl urea, thiourea, 1,3-dimethyl-2-imidazolidinone, or a betaine (such as trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, or acetylcarnitine). As the amine, for example, diethanolamine, triethanolamine, or triisopropanolamine may be mentioned.

Ink Set

In this embodiment, an ink set including the white ink composition described above and at least one non-white ink composition may be formed.

The non-white ink composition contains a non-white colorant and is an ink composition used to color a recording medium with a non-white color. As the non-white colorant, for example, a non-white pigment is preferable, and a cyan, a yellow, a magenta, or a black colorant may be mentioned.

The non-white ink composition may also contain a fixing resin which may be contained in the white ink composition described above. As the fixing resin, for example, there may be mentioned the above urethane resin having a THF soluble component in a two-hour dissolution time of 90 percent by mass or more and a glass transition temperature of 20° C. to 50° C., an urethane resin other than that described above, or a resin other than the urethane resins.

In the non-white ink composition, components other than the colorant and the fixing resin may be the same as those in the white ink composition. The number of the non-white ink compositions may be either one or at least two.

2. Ink Jet Recording Method

An ink jet recording method of this embodiment includes a white ink adhesion step of ejecting the above white ink composition by an ink jet method so as to be adhered to a low-absorbing recording medium or a non-absorbing recording medium.

In addition, the ink jet recording method of this embodiment may also include, if needed, a non-white ink adhesion step of ejecting a non-white ink composition which is an ink jet ink containing a non-white colorant by an ink jet method so as to be adhered to the low-absorbing recording medium or the non-absorbing recording medium. In this case, the white ink composition and the non-white ink composition are overlapped and adhered to the low-absorbing recording medium or the non-absorbing recording medium.

The adhesion order of the white ink composition and the non-white ink composition is not particularly limited, and after a non-white ink layer is formed by the non-white ink composition on the low-absorbing recording medium or the non-absorbing recording medium, a white ink layer may be formed by the white ink composition on the non-white ink layer, or after a white ink layer is formed by the white ink composition on the low-absorbing recording medium or the non-absorbing recording medium, a non-white ink layer may be formed by the non-white ink composition on the white ink layer.

Of those mentioned above, when the white ink layer is formed by the white ink composition on the non-white ink layer, the white ink layer appears at a surface of a recorded matter, and problems in terms of laminate strength, blocking resistance, and abrasion resistance are liable to occur in some cases; hence, the present disclosure is particularly effective.

2.1. Recording Medium

Although a recording medium used in the recording method of this embodiment is not particularly limited, a low-absorbing recording medium or a non-absorbing recording medium is used. The low-absorbing recording medium and the non-absorbing recording medium indicate a recording medium hardly absorbing an ink and a recording medium absorbing no ink, respectively. From a quantitative point of view, the recording medium used in this embodiment indicates a "recording medium having a water absorbing amount of 10 mL/m$^2$ or less from a contact start to a point of 30 msec$^{1/2}$ by Bristow method". The details of the test method has been disclosed in Standard No. 51 "Paper and Paperboard-Liquid Absorption Test Method-Bristow Method", JAPAN TAPPI PAPER AND PULP TEST METHODS, 2000. As a recording medium having the non-absorbing property as described above, for example, there may be mentioned a recording medium including a recording surface on which an ink receiving layer having an ink absorbing property is not provided or a recording medium including a recording surface on which a coating layer having a low ink absorbing property is provided.

Although the non-absorbing recording medium is not particularly limited, for example, a plastic film having no ink absorbing layer, a sheet in which a plastic is coated on a base material such as paper, or a sheet in which a plastic film is adhered to a base material may be mentioned. As the plastic in this case, a resin selected, for example, from a poly(vinyl chloride), a polyester such as a poly(ethylene terephthalate), a polycarbonate, a polystyrene, a polyurethane, and a polyolefin, such as a polyethylene or a polypropylene, may be mentioned. Resin films formed from those resins may be mentioned.

Although the low-absorbing recording medium is not particularly limited, for example, coating paper having a surface provided with a coating layer to receive an oily ink may be mentioned. The coating paper is not particularly limited, and for example, printing paper, such as art paper, coated paper, or matte paper, may be mentioned.

When the white ink composition of this embodiment is used, even on the recording medium described above, a recorded matter excellent in laminate strength and blocking resistance can be obtained by recording. In addition, a predetermined image excellent in fixing property and abrasion resistance can be easily formed.

Among those mentioned above, the white ink composition of this embodiment is preferably used for recording on a film formed from a poly(vinyl chloride) resin, a polyester resin, or a polyolefin resin. Since those films are liable to be degraded in terms of the blocking resistance, the laminate strength, and the abrasion resistance, the present disclosure is particularly effective. In particular, a polyester resin and a polyolefin resin are effective, and a polyolefin resin is more effective.

In addition, a recorded matter obtained by recording is preferably used after a recording surface thereof is processed by a laminate treatment. When the laminate treatment is performed, a problem of laminate strength may arise in some cases, and hence, the present disclosure is particularly effective.

Laminate Treatment

The laminate treatment is a treatment in which a protective film is laminated to a recording surface of a recording medium to which an ink is adhered, for example, by sticking a film thereto. In addition, although the laminate treatment is not particularly limited, after a known adhesive is adhered to a recording surface of a recorded matter, a film may be stuck thereon, or a film to which an adhesive is adhered may be stuck to a recording surface of a recorded matter. In addition, a molten resin formed from a molten film may be extruded on a recording surface of a recorded matter to form a film on the recording surface of the recorded matter. As a material of a film to be used for the laminate, for example, a resin-made film may be used. Since a recorded matter is laminated, the abrasion resistance of the recorded matter is preferably improved, or when the recorded matter is unfavorably handled such that a solid material is brought into contact therewith, a protection property is preferably improved. In addition, after the film is stuck to the recorded matter, the pressure is further preferably applied thereto by heating or at ordinary temperature so as to achieve a sufficient adhesion therebetween.

2.2. White Ink Adhesion Step

The white ink adhesion step is a step of adhering the white ink composition to a recording medium. In more particular, by driving a pressure generation device, the white ink composition filled in a pressure generation chamber of an ink jet head is ejected from a nozzle. The ejection method as described above is also called an ink jet method.

2.3. Non-White Ink Adhesion Step

The non-white ink adhesion step is a step of adhering the non-white ink composition to a recording medium. In more particular, by driving a pressure generation device, the non-white ink composition filled in a pressure generation chamber of an ink jet head is ejected from a nozzle.

An adhesion amount of the white ink composition is preferably 4 to 15 mg/inch$^2$ and more preferably 7 to 12 mg/inch$^2$. An adhesion amount of the non-white ink composition is preferably 2 to 12 mg/inch$^2$ and more preferably 5 to 10 mg/inch$^2$. When the white ink composition and the non-white ink composition are overlapped and adhered, the adhesion amount of the ink composition described above is an adhesion amount per unit area of a region to which the ink compositions are overlapped and adhered. In addition, the adhesion amount of the ink composition described above is preferably an adhesion amount of the white ink composition in a region in which the adhesion amount of the white ink composition is largest and an adhesion amount of the non-white ink composition in a region in which the adhesion amount of the non-white ink composition is largest. The adhesion amount of the white ink composition is preferably larger than the adhesion amount of the non-white ink composition since a shielding ability of a background image is further improved. The adhesion amount of the white ink composition is larger than that of the non-white ink composition preferably by 1 mg/inch$^2$ or more and more preferably by 2 to 10 mg/inch$^2$.

The non-white ink is not particularly limited, and an ink containing at least one arbitrary component may be used.

As the ink jet heads used in the white ink adhesion step and the non-white ink adhesion step, a line head to perform recording by a line method or a serial head to perform recording by a serial method may be mentioned.

In the line method using a line head, for example, an ink jet head having a width larger than or equal to a recording width of a recording medium is fixed to an ink jet apparatus. In addition, the recording medium is transferred along a sub-scanning direction (longitudinal direction of the recording medium, transport direction thereof), and in association with this transfer, ink droplets are ejected from a nozzle of the ink jet head, so that an image is recorded on the recording medium.

In the serial method using a serial head, for example, an ink jet head is mounted on a carriage configured to be transferred in a width direction of a recording medium. In addition, the carriage is transferred in a main scanning direction (lateral direction of the recording medium, width direction thereof), and in association with this transfer, ink droplets are ejected from a nozzle opening of the head, so that an image can be recorded on the recording medium. The main scanning as described above is performed at least two times, so that recording is performed.

The ink jet recording method may also include a primary heating step and a secondary heating step.

The primary heating step is a step to promote drying of an ink adhered to a recording medium by heating at an early stage such that the recording medium is heated before the ink is adhered thereto or the recording medium is heated immediately after the ink is adhered thereto. In the primary heating step, a surface temperature of the recording medium immediately after the ink is adhered thereto or a surface temperature of the recording medium before the ink is adhered thereto is preferably 25° C. to 50° C., more preferably 28° C. to 45° C., further preferably 32° C. to 40° C., and particularly preferably 35° C. to 38° C.

The secondary heating step is a step to sufficiently heat the recording medium on which the adhesion of an ink is completed so as to enable a fixing resin contained in the ink to form a flat film. In the secondary hating step, a surface temperature of the recording medium is preferably 50° C. to 120° C. and more preferably 60° C. to 100° C.

3. Recording Apparatus

FIGURE shows one example of a recording apparatus used for the recording method of this embodiment. As shown in FIGURE, a recording apparatus 1 includes a feed portion 10 for a recording medium, a transport portion 20, a record portion 30, a dry portion 40, and a discharge portion 50.

The feed portion 10 feeds a roll-shaped recording medium which is one example of the recording medium in a transport direction F. The transport portion 20 transports the recording medium fed by the feed portion 10 to the discharge portion 50 through the record portion 30 and the dry portion 40.

The record portion 30 performs recording by ejecting and adhering each ink composition to the recording medium. The record portion 30 includes a plurality of ink jet heads and is also able to eject at least two types of inks. The ink jet head shown in FIGURE is a line ink jet head having a length larger than or equal to a recording width of a recording medium F in a width direction X. During the recording, the ink jet head is not transferred, and one pass recording method (line recording method) is performed such that while the recording medium F is transported in a Y direction, scanning is performed once by ejecting at least one treatment liquid and at least one ink composition from respective containers so as to be adhered to the recording medium F.

In addition, the recording apparatus 1 may also be a serial printer in which while being transferred in a front-to-rear direction in FIGURE, that is, in the width direction X of the recording medium F, an ink jet type ink jet head performs scanning (main scanning) such that the ink composition and the treatment liquid are ejected and adhered to the recording medium F which faces the ink jet head.

In FIGURE, three ink jet heads are provided, that is, two ink jet heads 31 to eject white ink compositions W are provided upstream and downstream, and an ink jet head 32 to eject a non-white ink composition C is provided between the ink jet heads 31. Accordingly, for example, after the white ink composition W is adhered to the recording medium, the non-white ink composition C can be adhered thereon, or after the non-white ink composition C is adhered to the recording medium, the white ink composition W can be adhered thereon. The number of the ink jet heads is not limited to that shown in FIGURE and may be determined in accordance with the number of inks to be used for recording.

The dry portion 40 includes a pre-heater 41 to heat the recording medium before supplied to the record portion, a platen heater 42 provided at a portion facing the record portion, and an after heater 43 provided downstream than the record portion.

The discharge portion 50 further transports the recording medium in the transport direction F and discharges it outside of the ink jet recording apparatus 1. In particular, the discharge portion 50 may be a roller to wind the discharged recording medium.

EXAMPLES

Hereinafter, with reference to examples and comparative examples, the present disclosure will be described in more detail. However, the present disclosure is not limited to the following examples.

1. INC Composition 1.1. Preparation of Urethane Resin

Production Example 1: Resin 1

In a reaction chamber equipped with a dripping device, a thermometer, a water-cooling reflux condenser, a nitrogen inlet tube, a stirring device, and a temperature controller, 70 parts of a polyether polyol (polyoxypropylene glycol, Mw: 1,500), 26 parts of isophorone diisocyanate, 23 parts of 2,2-dimethylolpropionic acid, and 76 parts of methyl ethyl ketone were charged, and polymerization was then performed at 75° C. for 3 hours. In addition, a salt solution prepared in advance which contained 14 parts of methyl ethyl ketone, 4 parts of tetraethylene glycol, and 1.2 parts of sodium hydroxide was added, and polymerization was further performed at 75° C. for 2 hours. After this urethane prepolymer solution was cooled to 30° C., an aqueous solution in which 3 parts of trimethylolpropane was dissolved in 260 parts of water was dripped, so that a cross-linking reaction by phase inversion emulsification was performed. After stirring was performed for 1 hour, methyl ethyl ketone and water were partially distilled out at 50° C. under reduced pressure, so that a polyurethane aqueous dispersion was obtained. This polyurethane aqueous dispersion was filtrated by a 5.0-μm filter, so that an aqueous dispersion liquid of an urethane resin was prepared. Water was added thereto for concentration control, so that an emulsion at a solid content concentration of 40% was obtained.

The urethane resin thus obtained had a glass transition temperature (Tg) of 41° C. measured by a DSC method. The THF soluble component in a two-hour dissolution time was 96%, and the THF soluble component in a 15-minute dissolution time was 96%. A measured acid value was 79 mgKOH/g.

Production Examples 2 to 5: Resins 2 to 5

In the above production example 1, except for that the polyoxypropylene glycol was partially replaced with a polytetramethylene glycol (Mw: 2,000) or a polyoxyethylene glycol (Mw: 1,000), and furthermore, a mass ratio of the polyisocyanate component and the polyol component was adjusted, an aqueous dispersion liquid of an urethane resin was prepared by the method of the production example 1.

Production Examples 6 to 8: Resins 6 to 8

In the above production example 1, except for that the dripping amount of trimethylolpropane was changed, an aqueous dispersion liquid of an urethane resin was prepared by the method of the production example 1. In addition, in production example 7 for resin 7, no trimethylolpropane was dripped, so that the cross-linking reaction was not performed. Accordingly, resins 6 to 8 in each of which the THF soluble component in a two-hour dissolution time and the THF soluble component in a 15-minute dissolution time were adjusted were obtained.

Production Example 9: Resin 9

In the above production example 1, except for that 26 parts of isophorone diisocyanate was changed to 26 parts of hydrogenated XDI (cyclohexane-1,2-diylbis(methylene)diisocyanate), an aqueous dispersion liquid of an urethane resin was prepared by the method of the production example 1.

Production Example 10: Resin 10

In the above production example 1, except for that 26 parts of isophorone diisocyanate was changed to 26 parts of hexamethylene diisocyanate, an aqueous dispersion liquid of an urethane resin was prepared by the method of the production example 1.

Production Examples 11 and 12: Resins 11 and 12

In the production example 2 for the resin 2, except for that the addition amount of 2,2-dimethylolpropionic acid was changed, an aqueous dispersion liquid of an urethane resin was prepared by the method of the production example 2. Accordingly, resins 11 and 12 in each of which the acid value was adjusted were obtained. The acid value of the resin 11 was 55 mgKOH/g, and the acid value of the resin 12 was 42 mgKOH/g.

Production Example 13: Resin 13

In the production example 7 for the resin 7, except for that 26 parts of isophorone diisocyanate was changed to 26 parts of hydrogenated XDI (cyclohexane-1,2-diylbis(methylene) diisocyanate), an aqueous dispersion liquid of an urethane resin was prepared by the method of the production example 7.

Production Example 14: Resin 14

In the production example 7 for the resin 7, except for that 26 parts of isophorone diisocyanate was changed to 13 parts of hydrogenated XDI (cyclohexane-1,2-diylbis(methylene) diisocyanate) and 13 parts of hexamethylene diisocyanate, an aqueous dispersion liquid of an urethane resin was prepared by the method of the production example 7.

Production Example 15: Resin 15

In the production example 7 for the resin 7, except for that 26 parts of isophorone diisocyanate was changed to 26 parts of hexamethylene diisocyanate, an aqueous dispersion liquid of an urethane resin was prepared by the method of the production example 7.

In addition, in the examples in each of which the type of polyisocyanate was changed, if needed, the mass ratio of the polyisocyanate component and the polyol component was also adjusted so that Tg had a value as shown in the table.

1.2. Measurement of THF Soluble Component

In the measurement of the THF soluble component in a two-hour dissolution time and the THF soluble component in a 15-minute dissolution time, a dry mass of an urethane resin was measured, and a mixture liquid containing 100 g of tetrahydrofuran with respect to 1 g of the resin was prepared. In addition, immediately after the preparation of the mixture liquid, the mixture liquid was centrifuged at 25° C. and at 17,000 rpm for 2 hours or 15 minutes, and a gel (solid content) remaining on a bottom of a container was separated. Finally, the mixture liquid after the gel was removed was dried, an urethane resin dissolved in THF was dried, and a dry mass of the urethane resin was measured. By the following equation, the THF soluble component in a two-hour dissolution time and the THF soluble component in a 15-minute dissolution time were calculated.

THF soluble component (%)=(dry mass of urethane resin dissolved in THF)/dry mass of initial urethane resin×100

1.3. Measurement of Glass Transition Temperature (Tg)

The glass transition temperature (Tg) of the urethane resin thus prepared was measured by a DSC method using a differential scanning calorimeter (DSC7000, manufactured by Hitachi Hi-Tech Science Corporation).

1.4. Measurement of Acid Value

The acid value of an urethane resin was measured using AT610 (trade name) manufactured by Kyoto Electronics Manufacturing Co., Ltd.) and was calculated from the following equation (1). In addition, by a colloid titration using a potential difference, the acid value of a high molecular weight material dissolved in tetrahydrofuran can be measured. As a titration reagent for this measurement, an ethanol solution of sodium hydroxide was used.

Acid value (mg/g)=($EP1-BL1$)×$FA1$×$C1$×$K1$/SIZE    (1)

In the above equation, EP1 represents a titration amount (mL), BL1 represents a blank value (0.0 mL), FA1 represent a factor of a titration liquid (1.00), C1 represents a concentration based value (5.611 mg/mL) (0.1 mol/L, corresponding to an amount of potassium hydroxide in 1 mL), K1 represents a factor (1), and SIZE represents a sample amount (g).

1.5. Preparation of Ink Composition

Components shown in the following Table 1 were sufficiently stirred, so that white ink compositions and non-white ink compositions were prepared. The numerical values shown in the following Table 1 each indicate percent by mass unless otherwise particularly noted. In addition, "W" represents a white ink, and "C" represents a color ink. A pigment and a dispersant which was a water-soluble resin not shown in the table were mixed and stirred in water in advance at a ratio of 1:0.3 percent by mass basis, and a pigment dispersion liquid thus prepared was used. In the table, the components, such as the pigment and the resin, each represent its solid content.

TABLE 1

| | | Tg (° C.) | THF SOLUBLE COMPONENT (%) 2 HOURS | THF SOLUBLE COMPONENT (%) 15 MIN-UTES | ACID VALUE (mgKOH/ g) | WHITE INK W1 | W2 | W3 | W4 | W5 | W6 | W7 | W8 | W9 |
|---|---|---|---|---|---|---|---|---|---|---|---|---|---|---|
| PIGMENT | | WHITE PIGMENT | | | | 15 | 15 | 15 | 15 | 15 | 15 | 15 | 15 | 15 |
| | | NON-WHITE PIGMENT | | | | | | | | | | | | |
| FIXING RESIN | RESIN 1 | 41 | 96 | 96 | 79 | 7 | | | | | | | | |
| | RESIN 2 | 25 | 98 | 98 | 79 | | 7 | | | | | | | |
| | RESIN 3 | 47 | 96 | 96 | 79 | | | 7 | | | | | | |
| | RESIN 4 | 18 | 97 | 97 | 79 | | | | 7 | | | | | |

TABLE 1-continued

|  |  |  |  |  |  |  |  |  |  |  |  |  |  |
|---|---|---|---|---|---|---|---|---|---|---|---|---|---|
|  | RESIN 5 | 56 | 96 | 96 | 79 |  |  |  |  |  | 7 |  |  |
|  | RESIN 6 | 43 | 86 | 86 | 79 |  |  |  |  |  |  | 7 |  |
|  | RESIN 7 | 38 | 100 | 100 | 79 |  |  |  |  |  |  |  | 7 |
|  | RESIN 8 | 40 | 92 | 92 | 79 |  |  |  |  |  |  |  |  | 7 |
|  | RESIN 9 | 40 | 97 | 70 | 79 |  |  |  |  |  |  |  |  |  | 7 |
|  | RESIN 10 | 39 | 98 | 60 | 79 |  |  |  |  |  |  |  |  |  |  |
|  | RESIN 11 | 25 | 96 | 96 | 55 |  |  |  |  |  |  |  |  |  |  |
|  | RESIN 12 | 25 | 96 | 96 | 42 |  |  |  |  |  |  |  |  |  |  |
|  | RESIN 13 | 40 | 100 | 71 | 79 |  |  |  |  |  |  |  |  |  |  |
|  | RESIN 14 | 40 | 100 | 60 | 79 |  |  |  |  |  |  |  |  |  |  |
|  | RESIN 15 | 39 | 100 | 52 | 79 |  |  |  |  |  |  |  |  |  |  |
| WATER-SOLUBLE ORGANIC SOLVENT | PROPYLENE GLYCOL |  |  |  |  | 10 | 10 | 10 | 10 | 10 | 10 | 10 | 10 | 10 |
|  | 1,2-HEXANEDIOL |  |  |  |  | 5 | 5 | 5 | 5 | 5 | 5 | 5 | 5 | 5 |
|  | 3-METHOXY-3-METHYL-1-BUTANOL |  |  |  |  |  |  |  |  |  |  |  |  |  |
|  | TRIETHYLENE GLYCOL MONOBUTYL ETHER |  |  |  |  |  |  |  |  |  |  |  |  |  |
|  | 3-METHOXY-N,N-DIMETHYLPROPIONAMIDE |  |  |  |  | 12 | 12 | 12 | 12 | 12 | 12 | 12 | 12 | 12 |
|  | 2-PYRROLIDONE |  |  |  |  |  |  |  |  |  |  |  |  |  |
| WAX | AQUACER515 |  |  |  |  | 1 | 1 | 1 | 1 | 1 | 1 | 1 | 1 | 1 |
| pH ADJUSTER | TRIISOPROPANOLAMINE |  |  |  |  | 0.1 | 0.1 | 0.1 | 0.1 | 0.1 | 0.1 | 0.1 | 0.1 | 0.1 |
| SURFACTANT | BYK348 |  |  |  |  | 0.5 | 0.5 | 0.5 | 0.5 | 0.5 | 0.5 | 0.5 | 0.5 | 0.5 |
|  | PURIFIED WATER |  |  |  |  | BALANCE | BALANCE | BALANCE | BALANCE | BALANCE | BALANCE | BALANCE | BALANCE | BALANCE |
|  | TOTAL |  |  |  |  | 100 | 100 | 100 | 100 | 100 | 100 | 100 | 100 | 100 |

|  |  | Tg (° C.) | THF SOLUBLE COMPONENT (%) 2 HOURS | THF SOLUBLE COMPONENT (%) 15 MINUTES | ACID VALUE (mgKOH/g) | WHITE INK W10 | W11 | W12 | W13 | W14 | W15 | W16 | W17 |
|---|---|---|---|---|---|---|---|---|---|---|---|---|---|
| PIGMENT | WHITE PIGMENT |  |  |  |  | 15 | 15 | 15 | 15 | 15 | 15 | 15 | 15 |
|  | NON-WHITE PIGMENT |  |  |  |  |  |  |  |  |  |  |  |  |
| FIXING RESIN | RESIN 1 | 41 | 96 | 96 | 79 |  |  |  |  |  |  | 4 | 12 |
|  | RESIN 2 | 25 | 98 | 98 | 79 |  |  |  |  |  |  |  |  |
|  | RESIN 3 | 47 | 96 | 96 | 79 |  |  |  |  |  |  |  |  |
|  | RESIN 4 | 18 | 97 | 97 | 79 |  |  |  |  |  |  |  |  |
|  | RESIN 5 | 56 | 96 | 96 | 79 |  |  |  |  |  |  |  |  |
|  | RESIN 6 | 43 | 86 | 86 | 79 |  |  |  |  |  |  |  |  |
|  | RESIN 7 | 38 | 100 | 100 | 79 |  |  |  |  |  |  |  |  |
|  | RESIN 8 | 40 | 92 | 92 | 79 |  |  |  |  |  |  |  |  |
|  | RESIN 9 | 40 | 97 | 70 | 79 |  |  |  |  |  |  |  |  |
|  | RESIN 10 | 39 | 98 | 60 | 79 | 7 |  |  |  |  |  |  |  |
|  | RESIN 11 | 25 | 96 | 96 | 55 |  | 7 |  |  |  |  |  |  |
|  | RESIN 12 | 25 | 96 | 96 | 42 |  |  | 7 |  |  |  |  |  |
|  | RESIN 13 | 40 | 100 | 71 | 79 |  |  |  | 7 |  |  |  |  |
|  | RESIN 14 | 40 | 100 | 60 | 79 |  |  |  |  | 7 |  |  |  |
|  | RESIN 15 | 39 | 100 | 52 | 79 |  |  |  |  |  | 7 |  |  |
| WATER-SOLUBLE ORGANIC SOLVENT | PROPYLENE GLYCOL |  |  |  |  | 10 | 10 | 10 | 10 | 10 | 10 | 10 | 10 |
|  | 1,2-HEXANEDIOL |  |  |  |  | 5 | 5 | 5 | 5 | 5 | 5 | 5 | 5 |
|  | 3-METHOXY-3-METHYL-1-BUTANOL |  |  |  |  |  |  |  |  |  |  |  |  |
|  | TRIETHYLENE GLYCOL MONOBUTYL ETHER |  |  |  |  |  |  |  |  |  |  |  |  |
|  | 3-METHOXY-N,N-DIMETHYLPROPIONAMIDE |  |  |  |  | 12 | 12 | 12 | 12 | 12 | 12 | 12 | 12 |
|  | 2-PYRROLIDONE |  |  |  |  |  |  |  |  |  |  |  |  |
| WAX | AQUACER515 |  |  |  |  | 1 | 1 | 1 | 1 | 1 | 1 | 1 | 1 |
| pH ADJUSTER | TRIISOPROPANOLAMINE |  |  |  |  | 0.1 | 0.1 | 0.1 | 0.1 | 0.1 | 0.1 | 0.1 | 0.1 |
| SURFACTANT | BYK348 |  |  |  |  | 0.5 | 0.5 | 0.5 | 0.5 | 0.5 | 0.5 | 0.5 | 0.5 |
|  | PURIFIED WATER |  |  |  |  | BALANCE | BALANCE | BALANCE | BALANCE | BALANCE | BALANCE | BALANCE | BALANCE |
|  | TOTAL |  |  |  |  | 100 | 100 | 100 | 100 | 100 | 100 | 100 | 100 |

TABLE 1-continued

| | | Tg (° C.) | THF SOLUBLE COMPONENT (%) 2 HOURS | THF SOLUBLE COMPONENT (%) 15 MIN-UTES | ACID VALUE (mgKOH/g) | WHITE INK W18 | WHITE INK W19 | WHITE INK W20 | WHITE INK W21 | NON-WHITE INK C1 | NON-WHITE INK C2 | NON-WHITE INK C3 | NON-WHITE INK C4 |
|---|---|---|---|---|---|---|---|---|---|---|---|---|---|
| PIGMENT | WHITE PIGMENT | | | | | 10 | 15 | 15 | 15 | | | | |
| | NON-WHITE PIGMENT | | | | | | | | | 6 | 6 | 6 | 6 |
| FIXING RESIN | RESIN 1 | 41 | 96 | 96 | 79 | 7 | 7 | 7 | 7 | 4 | | | |
| | RESIN 2 | 25 | 98 | 98 | 79 | | | | | | | | |
| | RESIN 3 | 47 | 96 | 96 | 79 | | | | | | | | |
| | RESIN 4 | 18 | 97 | 97 | 79 | | | | | | 4 | | |
| | RESIN 5 | 56 | 96 | 96 | 79 | | | | | | | | 4 |
| | RESIN 6 | 43 | 86 | 86 | 79 | | | | | | | 4 | |
| | RESIN 7 | 38 | 100 | 100 | 79 | | | | | | | | |
| | RESIN 8 | 40 | 92 | 92 | 79 | | | | | | | | |
| | RESIN 9 | 40 | 97 | 70 | 79 | | | | | | | | |
| | RESIN 10 | 39 | 98 | 60 | 79 | | | | | | | | |
| | RESIN 11 | 25 | 96 | 96 | 55 | | | | | | | | |
| | RESIN 12 | 25 | 96 | 96 | 42 | | | | | | | | |
| | RESIN 13 | 40 | 100 | 71 | 79 | | | | | | | | |
| | RESIN 14 | 40 | 100 | 60 | 79 | | | | | | | | |
| | RESIN 15 | 39 | 100 | 52 | 79 | | | | | | | | |
| WATER-SOLUBLE ORGANIC SOLVENT | PROPYLENE GLYCOL | | | | | 10 | 10 | 10 | 10 | 10 | 10 | 10 | 10 |
| | 1.2-HEXANEDIOL | | | | | 5 | 5 | | | 5 | 5 | 5 | 5 |
| | 3-METHOXY-3-METHYL-1-BUTANOL | | | | | | | | 5 | | | | |
| | TRIETHYLENE GLYCOL MONOBUTYL ETHER | | | | | | | 5 | | | | | |
| | 3-METHOXY-N,N-DIMETHYLPROPIONAMIDE | | | | | 12 | | 12 | 12 | 12 | 12 | 12 | 12 |
| | 2-PYRROLIDONE | | | | | | 12 | | | | | | |
| WAX | AQUACER515 | | | | | 1 | 1 | 1 | 1 | 1 | 1 | 1 | 1 |
| pH ADJUSTER | TRIISOPROPANOLAMINE | | | | | 0.1 | 0.1 | 0.1 | 0.1 | 0.1 | 0.1 | 0.1 | 0.1 |
| SURFAC-TANT | BYK348 | | | | | 0.5 | 0.5 | 0.5 | 0.5 | 0.5 | 0.5 | 0.5 | 0.5 |
| | PURIFIED WATER | | | | | BAL-ANCE | BAL-ANCE | BAL-ANCE | BAL-ANCE | BAL-ANCE | BAL-ANCE | BAL-ANCE | BAL-ANCE |
| | TOTAL | | | | | 100 | 100 | 100 | 100 | 100 | 100 | 100 | 100 | white pigment: C.I. Pigment White 6
non-white pigment: C.I. Pigment Blue 15: 3
AQUACER515: aqueous emulsion of polyolefin wax (solid content concentration: 35 percent by weight) manufactured by BYK
BYK348: silicone-based surfactant, manufactured by BYK 2. Evaluation
2.1. Recorded Matter For an evaluation test, as a ink jet recording type printer, an ink jet printer L-4533AW (manufactured by Seiko Epson Corporation) was used as a modified line printer in which a pre-heater, a platen heater, and an after heater were provided as shown in FIGURE.

Next, a white ink and a non-white ink shown in Table 1 were each filled in an ink cartridge of the printer. Subsequently, by using the ink jet printer described above, printing of an image on an A4-size recording medium and drying of the image were performed.

2.1.1. Recording Conditions

In particular, in Examples 1 to 20 and Comparative Examples 1 to 3, the white ink was ejected under printing conditions at a resolution of 600×600 dpi and an adhesion amount of 10 mg/inch$^2$ and was adhered to a recording medium, so that a solid pattern was formed.

In addition, in Examples 21, 23, and 24, first, the non-white ink was ejected under printing conditions at a resolution of 600×600 dpi and an adhesion amount of 7 mg/inch$^2$, and subsequently, the white ink was ejected under printing conditions at a resolution of 600×600 dpi and an adhesion amount of 10 mg/inch$^2$, so that those inks were overlapped and adhered to a recording medium. Accordingly, a solid pattern image in which the white ink was adhered on the non-white ink was formed. "C→W" in Table 2 represents the printing order described above.

Furthermore, in Example 22, first, the white ink was ejected under printing conditions at a resolution of 600×600 dpi and an adhesion amount of 10 mg/inch$^2$, and subsequently, the non-white ink was ejected under printing conditions at a resolution of 600×600 dpi and an adhesion amount of 7 mg/inch$^2$, so that those inks were overlapped and adhered to a recording medium. Accordingly, a solid pattern image in which the non-white ink was adhered on the white ink was formed. "W→C" in Table 2 represents the printing order described above.

In Reference Examples 1 to 4, the non-white ink was ejected under printing conditions at a resolution of 600×600 dpi and an adhesion amount of 7 mg/inch$^2$ and was adhered to a recording medium, so that a solid pattern was formed.

2.1.2. Recording Medium

As the recording medium, the following was used.
M1: surface-treated polypropylene film (OPP) (Pyrene P-2161, manufactured by Toyobo Co., Ltd.)
M2: surface-treated polyester film (PET) (ESPET E-5102, manufactured by Toyobo Co., Ltd.)
M3: Scotchcal graphics film IJ8150 (vinyl chloride film, manufactured by 3M)

2.1.3. Heating Conditions

As the primary heating, the recording medium was heated by the pre-heater and the platen heater provided in the printer so that a surface temperature of the recording medium was set to 35° C., and as the secondary heating, the recording medium was heated by the after heater so that the surface temperature of M1 was set to 65° C. In addition, when the recording media M2 or M3 was used, the secondary heating temperature was set to 90° C.

2.2. Evaluation of Laminate Strength

After a dry-laminate adhesive (main agent: TM-329/curing agent: CAT-8b, manufactured by Toyo-Morton, Ltd.) was applied on an image portion of a recorded matter thus recorded using a bar coater, and a cast polypropylene film (CPP) film (trade name, Pyrene P1128, manufactured by Toyobo Co., Ltd.) was adhered thereto, aging was performed at 40° C. for 48 hours.

After a laminate thus obtained was cut to have a width of 15 mm, a peeling strength and a laminate strength thereof were measured using a T-type peeling tester (test machine, Tensilon Universal Tester RTG-1250A, manufactured by A&D Company, Ltd.), and the "laminate strength" was evaluated in accordance with the following evaluation criteria.

Evaluation Criteria
A: image is not transferred to non-printing surface, and no tack feeling remains.
B: although image is not transferred to non-printing surface, slight tack feeling remains.
C: less than 50% of area of image is transferred to non-printing surface.
D: at least 50% of area of image is transferred to non-printing surface.

2.4. Evaluation of Abrasion Resistance (Drying)

To the image portion of the recorded matter thus recorded, rubbing was reciprocally performed 100 times at a reciprocal rate of 30 times per minute by a Gakushin-type fastness rubbing tester (AB-301, manufactured by Tester Sangyo Co., Ltd.) while a load of 200 g was applied on a rubbing white cotton cloth in a dry state. The image portion during the rubbing was observed by visual inspection, and the "abrasion resistance" was evaluated in accordance with the following criteria.

Evaluation Criteria
A: Image is not changed even when rubbing is performed 100 times or more.
B: Although scars slightly remain when rubbing is performed 100 times, image is not influenced.
C: image is changed when rubbing is performed 51 to 99 times.
D: image is changed when rubbing is performed 50 times or less.

TABLE 2

| | EXAMPLE | | | COMPARATIVE EXAMPLE | | | EXAMPLE | | | | | | | | |
|---|---|---|---|---|---|---|---|---|---|---|---|---|---|---|---|
| | 1 | 2 | 3 | 1 | 2 | 3 | 4 | 5 | 6 | 7 | 8 | 9 | 10 | 11 | 12 |
| WHITE INK | W1 | W2 | W3 | W4 | W5 | W6 | W7 | W8 | W9 | W10 | W11 | W12 | W13 | W14 | W15 |
| NON-WHITE INK | — | — | — | — | — | — | — | — | — | — | — | — | — | — | — |
| PRINTING ORDER | — | — | — | — | — | — | — | — | — | — | — | — | — | — | — |
| RECORDING MEDIUM | M1 | M1 | M1 | M1 | M1 | M1 | M1 | M1 | M1 | M1 | M1 | M1 | M1 | M1 | M1 |
| LAMINATE STRENGTH | B | A | C | A | D | D | A | C | B | C | B | C | A | B | B |
| BLOCKING RESISTANCE | B | B | A | D | A | A | C | A | B | B | A | A | A | A | A |
| ABRASION RESISTANCE | B | B | A | C | D | A | C | A | B | B | B | B | B | B | A |

| | EXAMPLE | | | | | | | | | | | | REFERENCE EXAMPLE | | | |
|---|---|---|---|---|---|---|---|---|---|---|---|---|---|---|---|---|
| | 13 | 14 | 15 | 16 | 17 | 18 | 19 | 20 | 21 | 22 | 23 | 24 | 1 | 2 | 3 | 4 |
| WHITE INK | W16 | W17 | W18 | W19 | W20 | W21 | W1 | W1 | W1 | W1 | W1 | W1 | — | — | — | — |
| NON-WHITE INK | — | — | — | — | — | — | — | — | C1 | C1 | C2 | C3 | C1 | C2 | C3 | C4 |
| PRINTING ORDER | — | — | — | — | — | — | — | — | C→W | W→C | C→W | C→W | — | — | — | — |
| RECORDING MEDIUM | M1 | M1 | M1 | M1 | M1 | M1 | M2 | M3 | M1 | M1 | M1 | M1 | M1 | M1 | M1 | M1 |
| LAMINATE STRENGTH | B | A | A | A | B | A | A | A | A | B | A | B | A | A | B | B |
| BLOCKING RESISTANCE | A | C | B | C | B | B | B | A | B | A | A | A | A | B | A | A |
| ABRASION RESISTANCE | C | A | A | A | B | A | A | A | B | A | B | A | A | B | A | A |

Evaluation Criteria
A: laminate strength of 5N/15 mm or more
B: laminate strength of 3N/15 mm to less than 5N/15 mm
C: laminate strength of 1N/15 mm to less than 3N/15 mm
D: laminate strength of less than 1N/15 mm 2.3. Evaluation of Blocking Resistance After two recorded matters thus recorded were prepared, a non-printing surface of one recorded matter was overlapped on an image portion of the other recorded matter and was then left at 40° C. for 24 hours while a load of 5 kgf/cm$^2$ was applied using a blocking tester (CO-201, a permanent strain tester, manufactured by Tester Sangyo Co., Ltd.).

After the recorded matters were left as described above, by the degree of image transfer obtained when the recorded matters were peeled away from each other, the "blocking property" was evaluated in accordance with the following criteria.

3. Evaluation Results

It is found that in all the examples each using a white ink composition which contains an urethane resin having a THF soluble component in a two-hour dissolution time of 90 percent by mass or more and a glass transition temperature of 20° C. to 50° C., a recorded matter excellent in laminate strength and blocking resistance can be obtained.

On the other hand, in all the comparative examples each using a white ink composition which contains an urethane resin other than the urethane resin described above, one of the laminate strength and the blocking resistance is inferior.

From the results of examples 1, 4, and 5, when the urethane resin has a higher THF soluble component in a two-hour dissolution time, the laminate strength is more excellent, and when the urethane resin has a lower THF soluble component in a two-hour dissolution time, the blocking resistance and abrasion resistance are more excellent.

Form the results of examples 1 to 3, when the urethane resin has a lower glass transition temperature, the laminate strength is more excellent, and when the urethane resin has a higher glass transition temperature, the blocking resistance and the abrasion resistance are more excellent.

From the results of examples 1 and 4, when the urethane resin has a higher THF soluble component in a two-hour dissolution time, the laminate strength tends to be further improved, and on the other hand, the blocking resistance and the abrasion resistance tend to be slightly degraded. From the results of examples 10 to 12, when the THF soluble component in a 15-minute dissolution time is decreased, the laminate strength and the blocking resistance are both more excellent.

From the results of examples 2, 8, and 9, when the acid value of the urethane resin is higher, the laminate strength is more excellent.

From the results of examples 1, 19, and 20, when the recording medium is formed from a polyolefin resin or a polyester resin, and in particular, when the recording medium is formed from a polyolefin resin, problems in terms of laminate strength, blocking resistance, and the like are particularly liable to occur.

From the results of examples 21 and 22, when the non-white ink is adhered in advance, and the white ink is adhered thereon, problems in terms of blocking resistance and abrasion resistance are particularly liable to occur.

In comparative example 1 in which the urethane resin having a glass transition temperatures of less than 20° C. is used, the blocking resistance is inferior.

In comparative example 2 in which the urethane resin having a glass transition temperatures of higher than 50° C. is used, the laminate strength and the abrasion resistance are inferior.

In comparative example 3 in which the urethane resin having a THF soluble component of less than 90 percent by mass is used, the laminate strength is inferior.

Furthermore, in reference examples 1 to 4, problems in terms of laminate strength, blocking resistance, and abrasion resistance are not generated, and from the results described above, it is confirmed that the problems in terms of laminate strength, blocking resistance, and abrasion resistance are generated by the use of the white ink.

What is claimed is:

1. A white ink composition which is an aqueous ink jet ink and which is used for recording on a low-absorbing recording medium or a non-absorbing recording medium, the white ink composition comprising:
    a white pigment; and
    a fixing resin,
    wherein the fixing resin contains a urethane resin having a THF soluble component in a two-hour dissolution time of 90 percent by mass or more and a glass transition temperature of 20° C. to 50° C.

2. The white ink composition according to claim 1, wherein the urethane resin has a THF soluble component in a 15-minute dissolution time of 40 percent by mass or more.

3. The white ink composition according to claim 1, wherein a content of the urethane resin with respect to the total mass of the white ink composition is 1.0 to 15 percent by mass.

4. The white ink composition according to claim 1, wherein a content of the white pigment with respect to the total mass of the white ink composition is 5.0 to 20 percent by mass.

5. The white ink composition according to claim 1, wherein the urethane resin is resin particles.

6. The white ink composition according to claim 1, wherein the urethane resin has an acid value of 40 to 100 mgKOH/g.

7. The white ink composition according to claim 1, further comprising a nitrogen-containing organic solvent.

8. The white ink composition according to claim 1, further comprising a glycol ether-based organic solvent having 8 carbon atoms or less.

9. The white ink composition according to claim 1, wherein the white ink composition is used for recording on a recording medium formed of a polyolefin resin.

10. The white ink composition according to claim 1, wherein the white ink composition forms a recorded matter having a recording surface by the recording, and the recording surface is processed by a laminate treatment.

11. The white ink composition according to claim 1, wherein the urethane resin has an alicyclic structure or an aromatic ring structure.

12. An ink jet recording method comprising:
a white ink adhesion step of ejecting the white ink composition according to claim 1 by an ink jet method so as to be adhered to a low-absorbing recording medium or a non-absorbing recording medium.

13. The ink jet recording method according to claim 12, further comprising a non-white ink adhesion step of ejecting by an ink jet method, a non-white ink composition which is an aqueous ink jet ink containing a non-white colorant so as to be adhered to the low-absorbing recording medium or the non-absorbing recording medium,
wherein the white ink composition and the non-white ink composition are overlapped and adhered to the low-absorbing recording medium or the non-absorbing recording medium.

14. The ink jet recording method according to claim 13, wherein on the low-absorbing recording medium or the non-absorbing recording medium, the non-white ink composition forms a non-white ink layer, and the white ink composition forms a white ink layer on the non-white ink layer.

* * * * *